United States Patent
Lee et al.

(10) Patent No.: US 12,423,246 B2
(45) Date of Patent: Sep. 23, 2025

(54) NONVOLATILE MEMORY DEVICE AND MEMORY SYSTEM

(71) Applicant: SAMSUNG ELECTRONICS CO., LTD., Suwon-si (KR)

(72) Inventors: Hanjun Lee, Suwon-si (KR); Suyong Kim, Suwon-si (KR); Seungjae Lee, Suwon-si (KR); Suchang Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 18/601,839

(22) Filed: Mar. 11, 2024

(65) Prior Publication Data
US 2025/0103513 A1    Mar. 27, 2025

(30) Foreign Application Priority Data
Sep. 21, 2023   (KR) .................. 10-2023-0126361

(51) Int. Cl.
*G06F 12/14* (2006.01)
*G06F 3/06* (2006.01)

(52) U.S. Cl.
CPC ........ *G06F 12/1408* (2013.01); *G06F 3/0622* (2013.01); *G06F 3/0656* (2013.01); *G06F 3/0679* (2013.01)

(58) Field of Classification Search
None
See application file for complete search history.

(56) References Cited

U.S. PATENT DOCUMENTS

| | | |
|---|---|---|
| 7,069,404 B1 | 6/2006 | Roche |
| 8,037,282 B2 | 10/2011 | Kim |
| 8,671,242 B2 | 3/2014 | Pekny |
| 10,257,192 B2 | 4/2019 | Shin et al. |
| 10,311,253 B2 | 6/2019 | Eppensteiner et al. |
| 2022/0155978 A1 | 5/2022 | Murphy et al. |
| 2023/0102649 A1 | 3/2023 | Van Leeuwen et al. |
| 2023/0141936 A1 | 5/2023 | Jung |

*Primary Examiner* — Kevin Verbrugge
(74) *Attorney, Agent, or Firm* — Fish & Richardson P.C.

(57) ABSTRACT

A nonvolatile memory device includes a memory cell array to store an original setting data, a page buffer circuit connected to the memory cell array through a plurality of bit-lines, a secure buffer and a control circuit. The secure buffer includes an access control circuit and a plurality registers with restricted access, and the plurality registers store the original setting data that is dumped-down from the memory cell array through the page buffer circuit in an initialization sequence. The control circuit controls the page buffer circuit and the secure buffer. The plurality registers include a first register and second registers. The access control circuit, in response to the first register being accessed, accesses at least a portion of the second registers concurrently with accessing the first register.

20 Claims, 26 Drawing Sheets

| CLE | COMMAND LATCH ENABLE |
|---|---|
| ALE | ADDRESS LATCH ENABLE |
| nCE | CHIP ENABLE |
| nRE | READ ENABLE |
| nWE | WRITE ENABLE |

| OSD_A | PERFORMANCE PARAMETERS (tR, tPROG, tERS) |
|---|---|
| OSD_B | RELIABILITY PARAMETERS |

NONVOLATILE MEMORY DEVICE AND MEMORY SYSTEM

CROSS-REFERENCE TO RELATED APPLICATION

This US application claims priority under 35 USC § 119 to Korean Patent Application No. 10-2023-0126361, filed on Sep. 21, 2023, in the Korean Intellectual Property Office (KIPO), the disclosure of which is incorporated herein by reference in its entirety.

BACKGROUND

A nonvolatile memory device such as a flash memory device, a resistive memory device, etc., may store data by programming each memory cell to have a threshold voltage distribution or a resistance distribution corresponding to different logic states. Initialization of the nonvolatile memory device may include a procedure of moving setting data stored in the nonvolatile memory device to another memory component. Three-dimensional nonvolatile memory devices such as a vertical NAND flash memory device are developed to increase an integration degree of memory cells. As the integration degree and the memory capacity of the nonvolatile memory device are increased, times for initializing and programming the nonvolatile memory device increase.

SUMMARY

Some implementations provide a nonvolatile memory device capable of preventing setting data from being hooked.

Some implementations provide a memory system including nonvolatile memory device capable of preventing setting data from being hooked.

According to some implementations, a nonvolatile memory device includes a memory cell array to store an original setting data, a page buffer circuit connected to the memory cell array through a plurality of bit-lines, a secure buffer and a control circuit. The secure buffer includes an access control circuit and a plurality registers with restricted access, and the plurality registers store the original setting data that is dumped-down from the memory cell array through the page buffer circuit in an initialization sequence. The control circuit controls the page buffer circuit and the secure buffer. The plurality registers include a first register and second registers. The access control circuit, in response to the first register being accessed, accesses at least a portion of the second registers concurrently with accessing the first register.

According to some implementations, a memory system includes a nonvolatile memory device and a memory controller to control the nonvolatile memory device. The nonvolatile memory device includes a memory cell array to store an original setting data, a page buffer circuit connected to the memory cell array through a plurality of bit-lines, a secure buffer and a control circuit. The secure buffer includes an access control circuit and a plurality registers with restricted access, and the plurality registers store the original setting data that is dumped-down from the memory cell array through the page buffer circuit in an initialization sequence. The control circuit controls the page buffer circuit and the secure buffer. The plurality registers include a first register and second registers. The access control circuit, in response to the first register being accessed, accesses at least a portion of the second registers concurrently with accessing the first register.

According to some implementations, a nonvolatile memory device includes a memory cell array to store an original setting data, a page buffer circuit connected to the memory cell array through a plurality of bit-lines, a secure buffer and a control circuit. The secure buffer includes an access control circuit and a plurality registers with restricted access, and the plurality registers store the original setting data that is dumped-down from the memory cell array through the page buffer circuit in an initialization sequence. The control circuit controls the page buffer circuit and the secure buffer. The plurality registers include a first register and second registers. The access control circuit, in response to the first register being accessed, accesses at least a portion of the second registers concurrently with accessing the first register. When the first register is accessed and a first setting data stored in the first register is changed, the access control circuit changes a respective setting data stored in each of the second registers by accessing the second registers concurrently with accessing the first register and recover the respective changed setting data stored in each of the second registers to a respective original setting data. The control circuit performs a core operation based on the changed first setting data and the recovered original setting data stored in the first register and the second registers.

Therefore, according to the nonvolatile memory device and the memory system according to some implementations, when a first register is selected and accessed from among a plurality of registers with restricted access in a secure buffer, a portion or all of the second registers are accessed simultaneously (e.g., concurrently) with accessing the first register. When a setting data stored in the first register is changed, corresponding setting data stored in the portion or all of the second registers that are accessed simultaneously with the first register are changed to the same setting data as the setting data stored in the first register and thus, the setting data stored in the plurality of registers are invalidated. Therefore, hooking the setting data may be prevented. Data "hooking" refers to the alteration or augmentation of data or software components by intercepting function calls, messages, events, data, etc., passed between software and/or hardware components.

BRIEF DESCRIPTION OF THE DRAWINGS

The above and other features of the present disclosure will become more apparent by describing in detail examples thereof with reference to the accompanying drawings.

DETAILED DESCRIPTION

Figure 1:
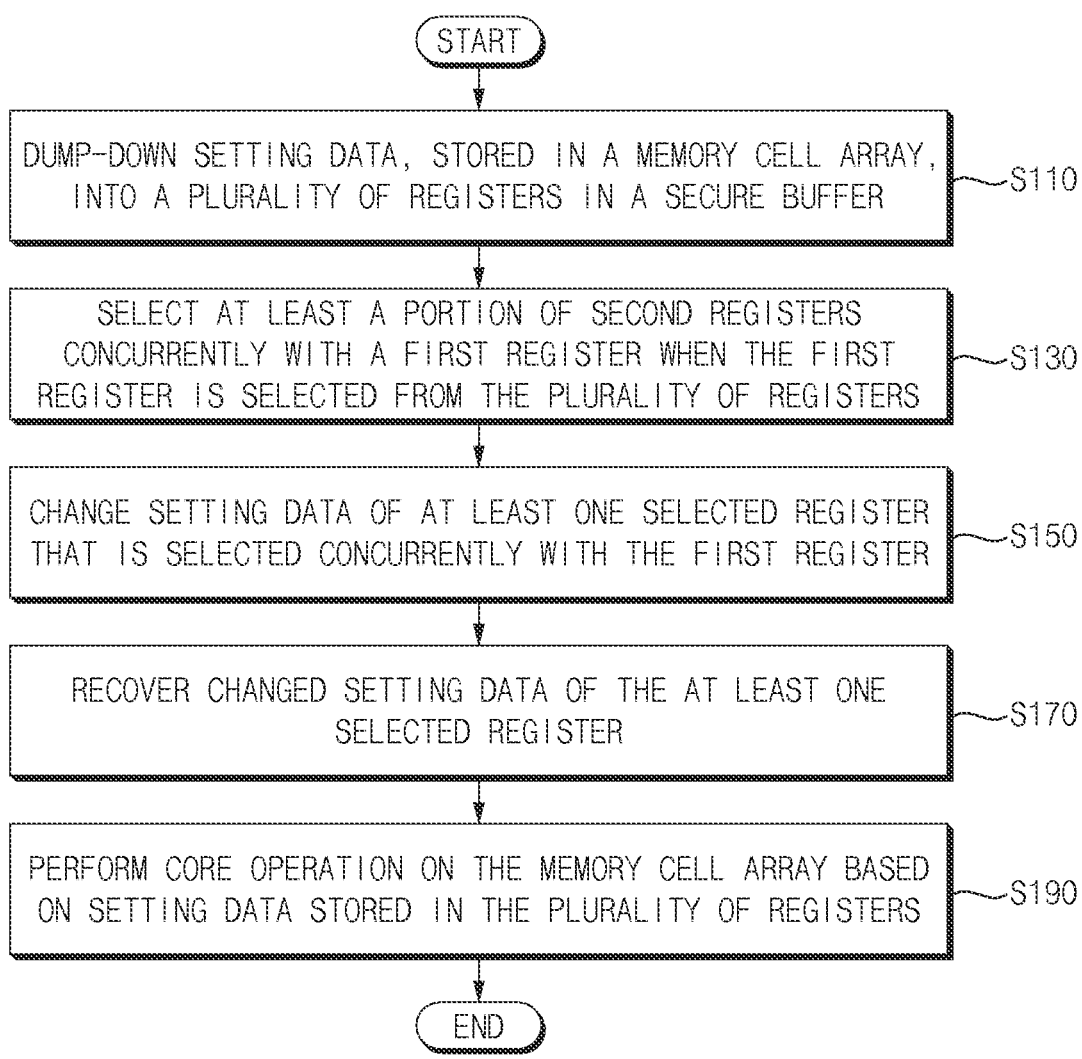
FIG. 1 is a flow chart illustrating a method of operating a nonvolatile memory device according to some implementations.

Some implementations of the present disclosure will be described more fully hereinafter with reference to the accompanying drawings. Like reference numerals may refer to like elements throughout the accompanying drawings.

FIG. 1 is a flow chart illustrating a method of operating a nonvolatile memory device according to some implementations.

In FIG. 1, there is provided a method of operating a nonvolatile memory device that includes a memory cell array, a page buffer circuit, a secure buffer including a plurality of registers with restricted access, and a control circuit.

Referring to FIG. 1, an original setting data that is stored in the memory cell array is dumped-down to the plurality of registers from the memory cell array through the page buffer circuit in an initialization sequence (operation S110). The plurality of registers may include a first register and second registers.

When the first register is accessed by an inside of the nonvolatile memory device or an outside of the nonvolatile memory device, at least a portion of the second registers (e.g., one or more of the second registers) is selected simultaneously with the first register (operation S130).

When the first register is accessed and a first setting data stored in the first register is changed, setting data stored in at least the portion of the second registers that are selected simultaneously with the first register is changed (operation S150).

The changed setting data stored in the at least the portion of the selected registers is recovered to obtain respective original setting data (operation S170).

The control circuit performs a memory operation on the memory cell array based on the changed setting data stored in the first register and the original setting data stored in the second registers (operation S190).

Setting data includes information for initialization of the nonvolatile memory device, which may be referred to as an IDR (information data read) data. The same setting data may be stored in a plurality of memory regions of the nonvolatile memory device. Even though the same setting data are stored in the plurality of memory regions, a read setting data may be distorted and different from a written setting data due to deviation of a program operation, deviations of a read operation, degeneration of the memory cells, and so on. Accordingly, when the read setting data from one memory region has uncorrectable errors, the read setting data may be loaded from another memory region.

A copy scheme of the setting data is different in different devices, device models, etc. In some implementations, the setting data may include plane replica data for correcting bit-line defects and string selection line (SSL) replica data for correcting SSL defects.

The initialization sequence or the IDR sequence may include "sensing" to read out the setting data from the memory cells to a page buffer circuit, "dump-down" to verify validity of the data stored in the page buffer circuit and store valid setting data in a buffer, and "following processes" to set operation conditions of the nonvolatile memory device based on the valid setting data in the buffer. For example, the following processes may include setting of levels of operation voltages, a WOR scan to exclude failed columns from a pass/fail operation, and so on.

A booting time of a product is affected directly by the initialization time and it is important to reduce the initialization time, To reduce the initialization time or the IRD time, it can be useful to perform the dump-down sequence efficiently because the dump-down sequence occupies most of the initialization time.

In addition, processes described herein can prevent the setting data from being hooked. According to some implementations, when a first register is selected and accessed from among a plurality of registers with restricted access in a secure buffer, a portion or all of the second registers are accessed simultaneously (e.g., concurrently) with accessing the first register, and, when a setting data stored in the first register is changed, corresponding setting data stored in the portion or all of the second registers that are accessed simultaneously with the first register are changed to the same setting data as the setting data stored in the first register and, thus, the setting data stored in the plurality of registers are invalidated. Therefore, hooking the setting data may be prevented. In addition, the changed setting data stored in the portion or all of the second registers that are accessed simultaneously with the first register are recovered to respective original setting data and a core operation may be performed based on setting data stored in the plurality of registers.

Figures 2, 3:
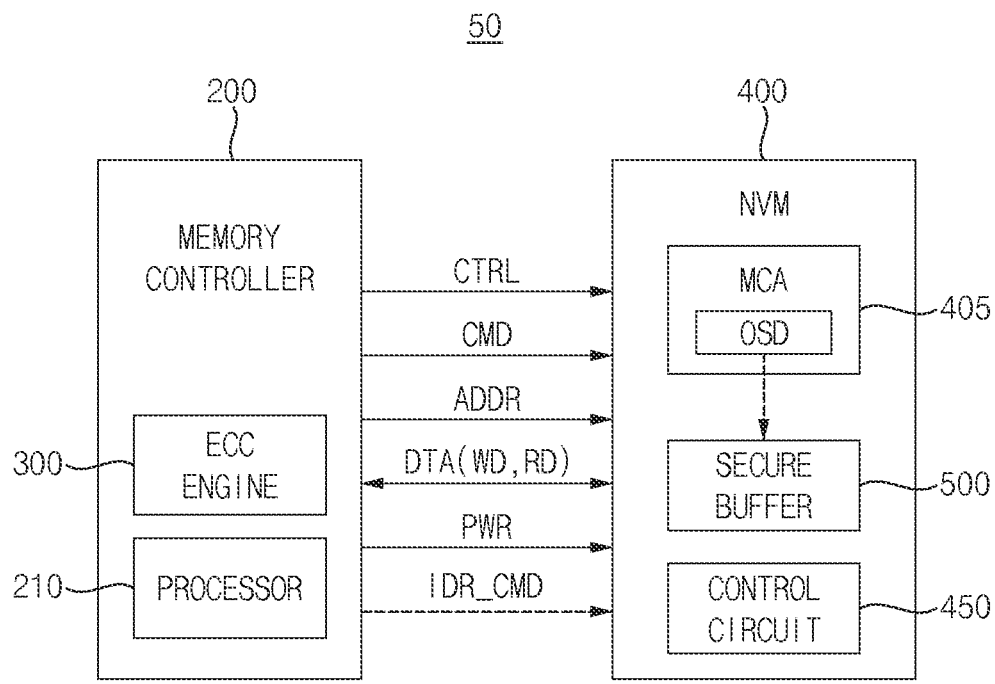
FIG. 2 is a block diagram illustrating a memory system according to some implementations.
FIG. 3 is a table illustrating control signals in the memory system of FIG. 1.

FIG. 2 is a block diagram illustrating a memory system according to some implementations.

Referring to FIG. 2, a memory system 50 may include a memory controller 200 and a nonvolatile memory device NVM 400.

In some implementations, each of the memory controller 200 and the nonvolatile memory device 400 may be provided in the form of a chip, a package, or a module. In some implementations, the memory controller 200 and the nonvolatile memory device 400 may be packaged into one of various packages and may be provided as a storage device such as a memory card.

The nonvolatile memory device 400 may perform an erase operation, a program operation or a read operation under control of the memory controller 200. The nonvolatile memory device 400 may receive a command CMD, an address ADDR and data DTA through input/output lines from the memory controller 200 for performing such operations. The data DTA may include a write data WD and a read data RD. In addition, the nonvolatile memory device 400 may receive a control signal CTRL through a control line from the memory controller 200. In addition, the nonvolatile memory device 400 may receive a power PWR through a power line from the memory controller 200.

The memory controller 200 may include a processor 210 and an error correction code (ECC) engine 300. The processor 210 may control an overall operation of the memory controller 200, for example, may apply an IDR command IDR_CMD to the nonvolatile memory device 400 in the initialization sequence. The IDR command IDR_CMD may be also referred to as a setting data read command or information data read command. The ECC engine 300 may perform an ECC encoding operation on data to be stored in the nonvolatile memory device 400 and may perform an ECC decoding operation on data read from the nonvolatile memory device 400.

The nonvolatile memory device 400 may include a memory cell array MCA 405, a control circuit 450 and a secure buffer 500.

The memory cell array 405 may store an original setting data OSD and the secure buffer 500 may store the original setting data OSD that is dumped-down from the memory cell array 405 through a page buffer circuit in the initialization sequence. The control circuit 450 may perform a core operation on the memory cell array 405 based on the original setting data OSD stored in the secure buffer 500.

FIG. 3 is a table illustrating control signals in the memory system of FIG. 1.

Referring to FIGS. 2 and 3, the control signal CTRL, which the memory controller 200 applies to the nonvolatile memory device 400, may include a command latch enable signal CLE, an address latch enable signal ALE, a chip enable signal nCE, a read enable signal nRE, and a write enable signal new.

The memory controller 200 may transmit the command latch enable signal CLE to the nonvolatile memory device 400. The memory controller 200 may transmit the command latch enable signal CLE to the nonvolatile memory device 400 via a separately assigned control pin. The command latch enable signal CLE may be a signal indicating that information transferred via the input/output lines is a command.

The memory controller 200 may transmit the address latch enable signal ALE to the nonvolatile memory device 400. The memory controller 200 may transmit the address latch enable signal ALE to the nonvolatile memory device 400 via a separately assigned control pin. The address latch enable signal ALE may be a signal indicating that information transferred via the input/output lines is an address.

The memory controller 200 may transmit the chip enable signal nCE to the nonvolatile memory device 400. The memory controller 200 may transmit the chip enable signal nCE to the nonvolatile memory device 400 via a separately assigned control pin. The chip enable signal nCE may indicate a memory chip selected from among a plurality of memory chips when the nonvolatile memory device includes the plurality of memory chips.

The memory controller 200 may transmit the read enable signal nRE to the nonvolatile memory device 400. The memory controller 200 may transmit the read enable signal nRE to the nonvolatile memory device 400 via a separately assigned control pin. The nonvolatile memory device 400 may transmit read data to the memory controller 200 based on the read enable signal nRE.

The memory controller 200 may transmit the write enable signal nWE to the nonvolatile memory device 400. The memory controller 200 may transmit the write enable signal nWE to the nonvolatile memory device 400 via a separately assigned control pin. When the write enable signal nWE is activated, the nonvolatile memory device 400 may store data input signals provided from the memory controller 200 as a command CMD or an address ADDR.

Figure 4:
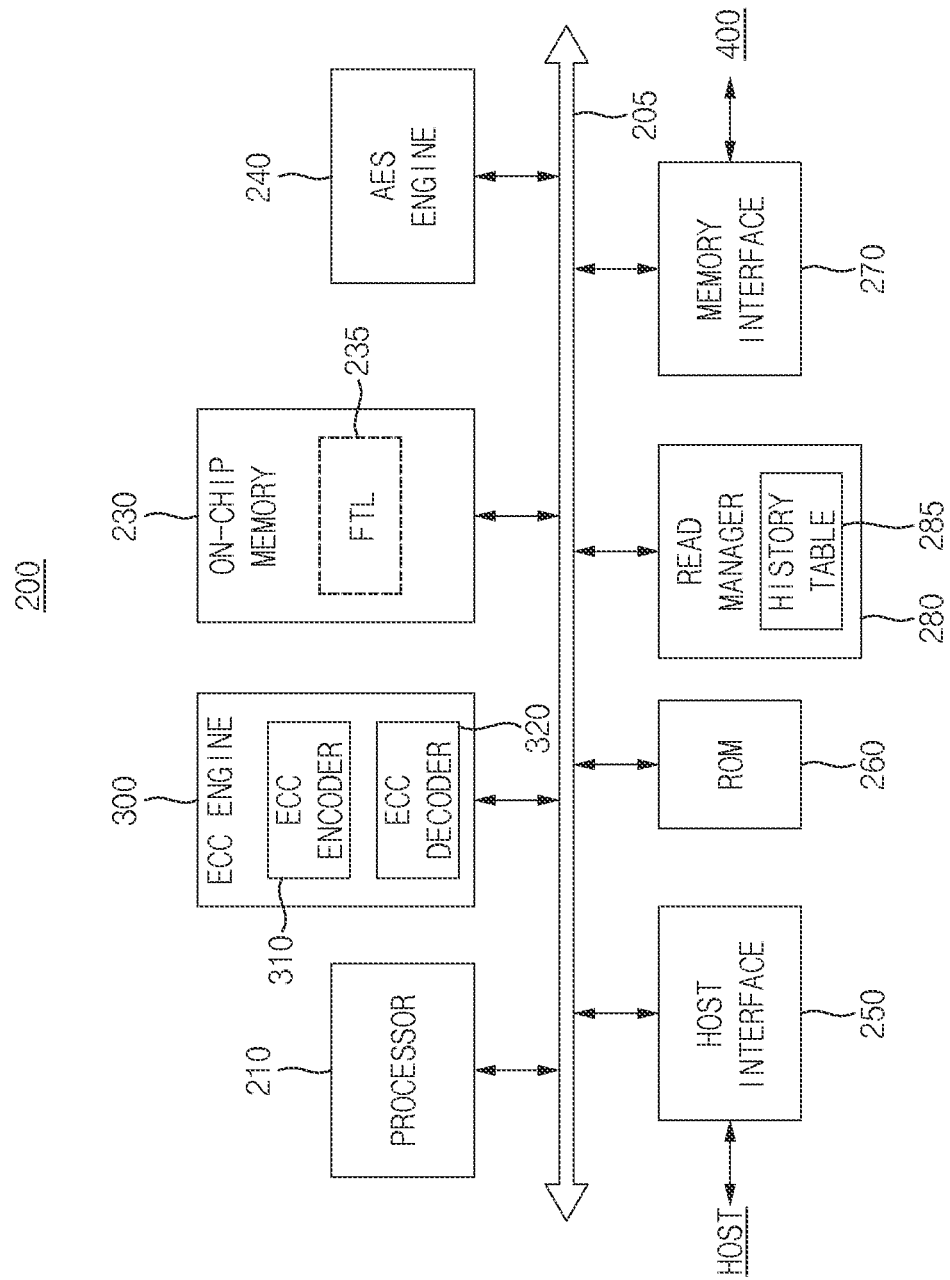
FIG. 4 is a block diagram illustrating an example of the memory controller in the memory system of FIG. 2 according to some implementations.

FIG. 4 is a block diagram illustrating an example of the memory controller in the memory system of FIG. 2 according to some implementations.

Referring to FIG. 4, the memory controller 200 may include the processor 210, the ECC engine 300, an on-chip memory 230, an advanced encryption standard (AES) engine 240, a host interface 250, a ROM 260, a memory interface 270, and a read manager 280 which are connected via a bus 205.

The processor 210 controls an overall operation of the memory controller 200. The processor 210 may control the ECC engine 300, the on-chip memory 230, the AES engine 240, the host interface 250, the ROM 260, the memory interface 270 and the read manager 280. The processor 210 may include one or more cores (e.g., a homogeneous multi-core or a heterogeneous multi-core). The processor 210 may be or include, for example, at least one of a central processing unit (CPU), an image signal processing unit (ISP), a digital signal processing unit (DSP), a graphics processing unit (GPU), a vision processing unit (VPU), and a neural processing unit (NPU). The processor 210 may execute various application programs (e.g., a flash translation layer (FTL) 235 and firmware) loaded onto the on-chip memory 230.

The on-chip memory 230 may store various application programs that are executable by the processor 210. The on-chip memory 230 may operate as a cache memory adjacent to the processor 210. The on-chip memory 230 may store a command, an address, and data to be processed by the processor 210 or may store a processing result of the processor 210. The on-chip memory 230 may be, for example, a storage medium or a working memory including a latch, a register, a static random access memory (SRAM), a dynamic random access memory (DRAM), a thyristor random access memory (TRAM), a tightly coupled memory (TCM), etc.

The processor 210 may execute the FTL 235 loaded onto the on-chip memory 230. The FTL 235 may be loaded onto the on-chip memory 230 as firmware or a program stored in the nonvolatile memory device 400. The FTL 235 may manage mapping between a logical address provided from a host and a physical address of the nonvolatile memory device 400 and may include an address mapping table manager configured to perform managing and updating an address mapping table. The FTL 235 may further perform a garbage collection operation, a wear leveling operation, and the like, as well as the address mapping described above. The FTL 235 may be executed by the processor 210 for addressing one or more of the following aspects of the nonvolatile memory device 400: overwrite- or in-place write-impossible, a life time of a memory cell, a limited number of program-erase (PE) cycles, and an erase speed slower than a write speed.

Memory cells of the nonvolatile memory device 400 may have the physical characteristic that a threshold voltage distribution varies due to various causes, such as a program elapsed time, a temperature, program disturbance, read disturbance and etc. For example, data stored at the nonvolatile memory device 400 may become erroneous due to the above causes.

The memory controller 200 may utilize a variety of error correction techniques to correct such errors. For example, the memory controller 200 may include the ECC engine 300. The ECC engine 300 may correct errors which occur in the data stored in the nonvolatile memory device 400. The ECC engine 300 may include the ECC encoder 310 and the ECC decoder 320. The ECC encoder 310 may perform an ECC encoding operation on data to be stored in the nonvolatile memory device 400. The ECC decoder 320 may perform an ECC decoding operation on data read from the nonvolatile memory device 400.

The ROM 260 may store, in firmware, a variety of information needed for the memory controller 200 to operate.

The AES engine 240 may perform at least one of an encryption operation and a decryption operation on data input to the memory controller 200 by using a symmetric-key algorithm. Although not illustrated in detail, the AES engine 240 may include an encryption module and a decryption module. For example, the encryption module and the decryption module may be implemented as separate modules. As another example, one module capable of performing both encryption and decryption operations may be implemented in the AES engine 240.

The read manager 280 may adjust and manage a plurality of read voltages associated with reading the data DTA stored in the nonvolatile memory device 400. For example, when the ECC engine 300 cannot correct errors in the data DTA read from the nonvolatile memory device 400, the read manager 280 may adjust the plurality of read voltages used in the nonvolatile memory device 400. The read manager 280 may include a read history table (e.g., a history table) 285 and may adjust the plurality of read voltages based on the read history table 285. The read manager 280 may read the data DTA stored in the nonvolatile memory device 400 at least two times and may adjust the plurality of read voltages based on the read data DTA.

In some implementations, the ECC engine 300 may have a given error correction capability. Data that includes error bits (or fail bits), the number of which exceeds the error correction capability of the ECC engine 300, are called 'uncorrectable ECC (UECC) data'. When the data DTA read from the nonvolatile memory device 400 are UECC data, the read manager 280 may adjust the plurality of read voltages and may again perform the read operation.

The read history table 285 may store a history of previous read voltages. For example, the read history table 285 may include information of read voltages read-passed in a previous read operation. The expression 'read-passed' indicates that data read by specific read voltages are normal data not including an error or that an error included in the read data is correctable by the ECC engine 300.

In some implementations, the read manager 280 may adjust the plurality of read voltages based on the read history table 285. That is, because read voltages are adjusted based on previously read-passed read voltages and the data DTA are read by using the adjusted read voltages (or read voltage levels), the probability that the error of the read data DTA is corrected by the ECC engine 300 may increase. That is, the probability of read pass may be improved.

A previously read-passed read voltage that is stored and managed in the read history table 285 is referred to as a 'history read voltage'. The read history table 285 may include information about history read voltages for each of a plurality of pages included in the nonvolatile memory device 400. For example, the read history table 285 may include information of previously read-passed read voltages for each word-line.

The read manager 280 may update the read history table 285. For example, the read manager 280 may detect an optimal read voltage. The optimal read voltage indicates read voltages read-passed when data are read. In some implementations, the read manager 280 may read data from the nonvolatile memory device 400 at least two times or more and may detect the optimal read voltage based on the read data. An operation of detecting the optimal read voltage is also called a valley search operation.

The memory controller 200 may communicate with the host through the host interface 250. For example, the host interface 250 may include Universal Serial Bus (USB), Multimedia Card (MMC), embedded-MMC, peripheral component interconnection (PCI), PCI-express, Advanced Technology Attachment (ATA), Serial-ATA, Parallel-ATA, small computer small interface (SCSI), enhanced small disk interface (ESDI), Integrated Drive Electronics (IDE), Mobile Industry Processor Interface (MIPI), Nonvolatile memory express (NVMe), Universal Flash Storage (UFS), etc. The memory controller 200 may communicate with the nonvolatile memory device 400 through the memory interface 270.

Figure 5:
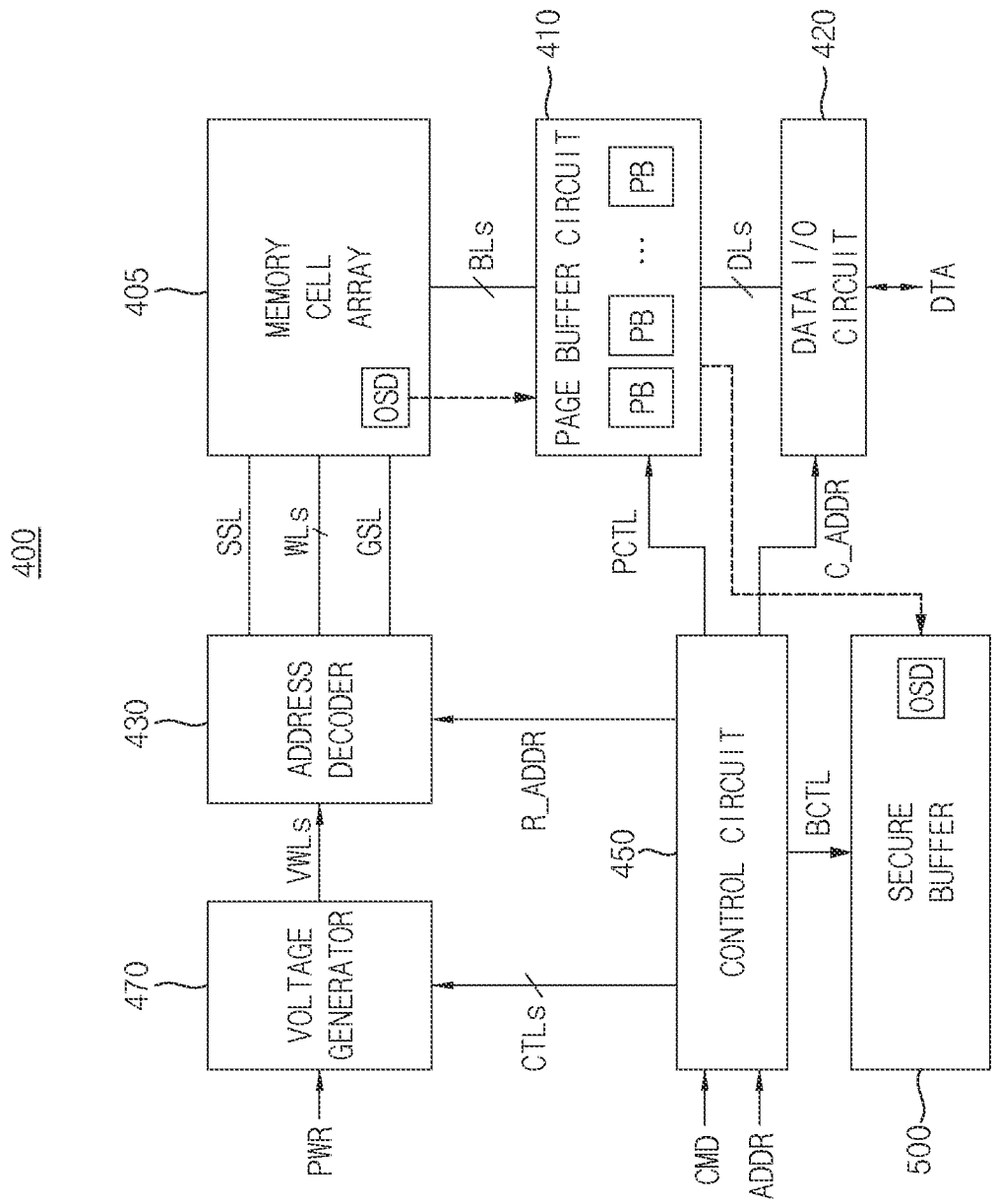
FIG. 5 is a block diagram illustrating an example of the nonvolatile memory device in the memory system of FIG. 2 according to some implementations.

FIG. 5 is a block diagram illustrating an example of the nonvolatile memory device in the memory system of FIG. 2 according to some implementations.

Referring to FIG. 5, the nonvolatile memory device 400 may include a memory cell array 405, an address decoder 430, a page buffer circuit 410, a data input/output (I/O) circuit 420, a control circuit 450, a secure buffer 500, and a voltage generator 470.

The memory cell array 405 may be coupled to the address decoder 430 through a string selection line SSL, a plurality of word-lines WLs, and a ground selection line GSL. In addition, the memory cell array 405 may be coupled to the page buffer circuit 410 through a plurality of bit-lines BLs. The memory cell array 405 may include a plurality of nonvolatile memory cells coupled to the plurality of word-lines WLs and the plurality of bit-lines BLs.

In some implementations, the memory cell array 405 may be a three-dimensional memory cell array, which is formed on a substrate in a three-dimensional structure (or a vertical structure). In this case, the memory cell array 405 may include (vertical) cell strings that are vertically oriented such that at least one memory cell is located over another memory cell.

The control circuit 450 may receive a command (signal) CMD and an address (signal) ADDR from the memory controller 200 and control an erase loop, a program loop and a read operation of the nonvolatile memory device 400 based on the command signal CMD and the address signal ADDR. The program loop may include a program operation and a program verification operation. The erase loop may include an erase operation and an erase verification operation.

For example, the control circuit 450 may generate control signals CTLs to control the voltage generator 470 and may generate a page buffer control signal PCTL to control the page buffer circuit 410 based on the command signal CMD. The control circuit 450 may generate a buffer control signal BCTL to control the secure buffer 500 and may provide the buffer control signal BCTL to the secure buffer 500. The control circuit 450 may generate a row address R_ADDR and a column address C_ADDR based on the address signal ADDR. The control circuit 450 may provide the row address R_ADDR to the address decoder 430 and provide the column address C_ADDR to the data input/output circuit 420.

The address decoder 430 may be coupled to the memory cell array 405 through the string selection line SSL, the plurality of word-lines WLs, and the ground selection line GSL. During the program operation or the read operation, the address decoder 430 may determine one of the plurality of word-lines WLs as a selected word-line and determine the rest of the plurality of word-lines WLs except for the selected word-line as unselected word-lines based on the row address R_ADDR.

The voltage generator 470 may generate word-line voltages VWLs, which are associated with operation of the nonvolatile memory device 400, based on the control signals CTLs. The voltage generator 470 may receive the power PWR from the memory controller 200. The word-line voltages VWLs may be applied to the plurality of word-lines WLs through the address decoder 430.

For example, during the erase operation, the voltage generator 470 may apply an erase voltage to channels of a cell string of the memory block and may apply a ground voltage to all word-lines of the memory block. During the erase verification operation, the voltage generator 470 may apply an erase verification voltage to all word-lines of the memory block or sequentially apply the erase verification voltage to word-lines on a word-line basis.

For example, during the program operation, the voltage generator 470 may apply a program voltage to the selected word-line and may apply a program pass voltage to the unselected word-lines. In addition, during the program verification operation, the voltage generator 470 may apply a program verification voltage to the selected word-line and may apply a verification pass voltage to the unselected word-lines. For example, during the read operation, the voltage generator 470 may apply a read voltage to the selected word-line and may apply a read pass voltage to the unselected word-lines.

The page buffer circuit 410 may be coupled to the memory cell array 405 through the plurality of bit-lines BLs. The page buffer circuit 410 may include a plurality of page buffers PB. The page buffer circuit 410 may temporarily store data to be programmed in a selected page or data read out from the selected page.

The data input/output circuit 420 may be coupled to the page buffer circuit 410 through a plurality of data lines DLs. During the program operation, the data input/output circuit 420 may receive program data DTA from the memory controller 200 and provide the program data DTA to the page buffer circuit 410 based on the column address C_ADDR received from the control circuit 450. During the read operation, the data input/output circuit 420 may provide read data DTA, which are stored in the page buffer circuit 410, to the memory controller 200 based on the column address C_ADDR received from the control circuit 450.

The memory cell array 405 may store the original setting data OSD and the page buffer circuit 410 may sense the original setting data OSD and dump-down the original setting data OSD to the secure buffer 500 in the initialization sequence.

The control circuit 450 may perform a core operation on the memory cell array 405 based on the original setting data OSD stored in the secure buffer 500. The secure buffer 500 may include a plurality of registers with restricted access. The plurality of registers include a first register and second registers. When the first register is selected and accessed by an internal module or a module/device external to the nonvolatile memory device 400, a portion or all of the second registers are accessed simultaneously (e.g., concurrently) with accessing the first register, and, when setting data stored in the first register is changed, corresponding setting data stored in the portion or all of the second registers that are accessed simultaneously with the first register are changed to the same setting data as the setting data stored in the first register and, thus, the setting data stored in the plurality of registers are invalidated. Therefore, hooking the setting data may be prevented.

Figure 6:
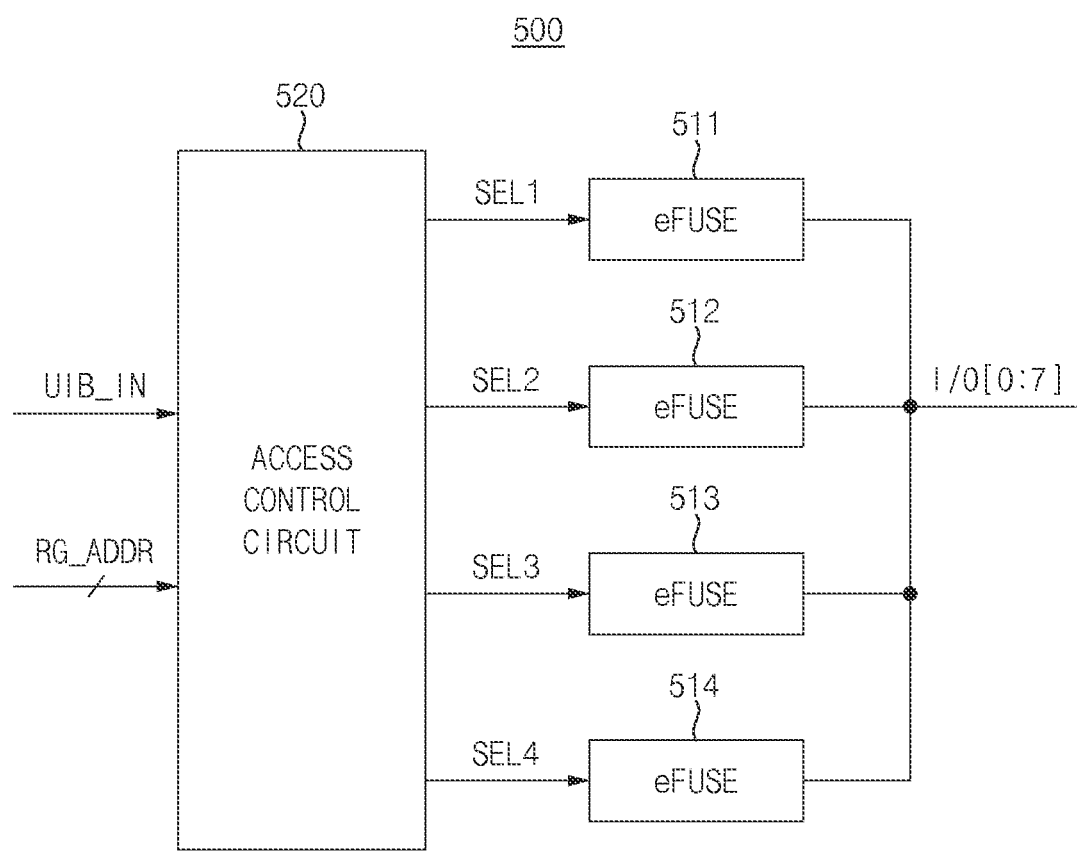
FIG. 6 is a block diagram illustrating an example of the secure buffer in the nonvolatile memory device of FIG. 5 according to some implementations.

FIG. 6 is a block diagram illustrating an example of the secure buffer in the nonvolatile memory device of FIG. 5 according to some implementations.

Referring to FIG. 6, the secure buffer 500 may include a plurality of registers 511, 512, 513 and 514 with restricted access and an access control circuit 520. The plurality of registers 511, 512, 513 and 514 may be connected to an input/output I/O line I/O [0:7]. Each of the plurality of registers 511, 512, 513 and 514 may be implemented with an e-fuse and the plurality of registers 511, 512, 513 and 514 may include a first register 511 and second registers 512, 513 and 514.

The access control circuit 520 may generate selection signals SEL1, SEL2, SEL3 and SEL4 each of which is for selecting a respective one of the plurality of registers 511, 512, 513 and 514 based on a register access mode signal UIB_IN and a register address RG_ADDR.

When a first selection signal SEL1 is activated and the first register 511 is accessed, the access control circuit 520 may access at least a portion of the second registers 512, 513 and 514 concurrently with accessing the first register 511 by activating at least a portion of second selection signals SEL2, SEL3 and SEL4 simultaneously with the first selection signal SEL1.

Figure 7:
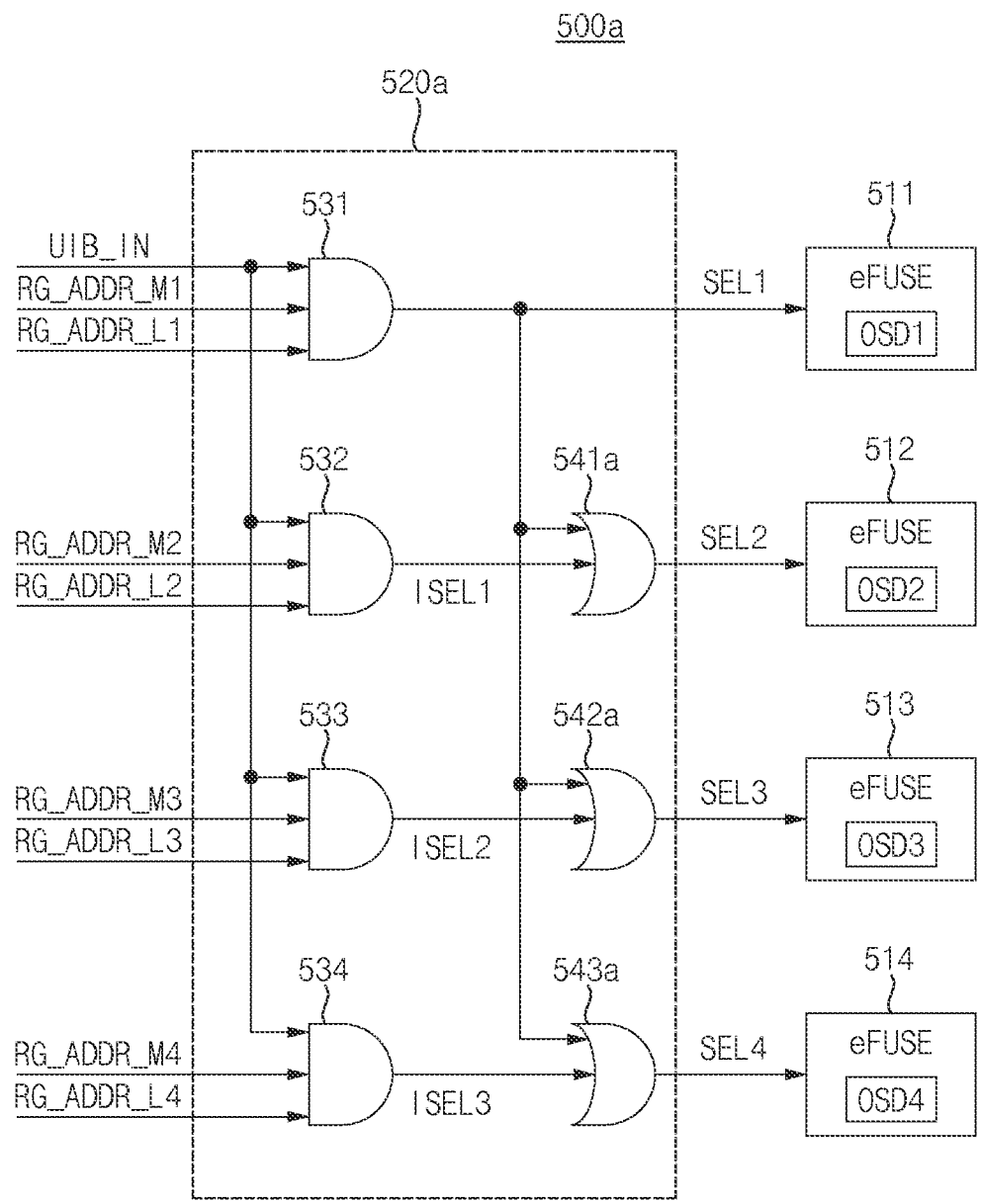
FIG. 7 is a block diagram illustrating an example of the secure buffer of FIG. 6 according to some implementations.

FIG. 7 is a block diagram illustrating an example of the secure buffer of FIG. 6 according to some implementations.

Referring to FIG. 7, a secure buffer 500*a* may include a plurality of registers 511, 512, 513 and 514 with restricted access and an access control circuit 520*a*. Each of the plurality of registers 511, 512, 513 and 514 may be implemented with an e-fuse and the plurality of registers 511, 512, 513 and 514 may include a first register 511 and second registers 512, 513 and 514. Each of original setting data OSD1, OSD2, OSD3 and OSD4 may be stored in a respective one of the first register 511 and the second registers 512, 513 and 514.

The access control circuit 520*a* may include a first AND gate 531, second AND gates 532, 533 and 534 and OR gates 541*a*, 542*a*, and 543*a*.

The first AND gate 531 may generate a first selection signal SEL1 for selecting the first register 511 based on the register access mode signal UIB_IN and bits RG_ADDR_M1 and RG_ADDR_L1 of a first register address designating the first register 511.

The second AND gate 532 may generate an intermediate selection signal ISEL1 associated with selecting the second register 512 based on the register access mode signal UIB_IN and bits RG_ADDR_M2 and RG_ADDR_L2 of a second register address designating the second register 512. The second AND gate 533 may generate an intermediate selection signal ISEL2 associated with selecting the second register 513 based on the register access mode signal UIB_IN and bits RG_ADDR_M3 and RG_ADDR_L3 of a second register address designating the second register 513. The second AND gate 534 may generate an intermediate selection signal ISEL3 associated with selecting the second register 514 based on the register access mode signal UIB_IN and bits RG_ADDR_M4 and RG_ADDR_L4 of a second register address designating the second register 514.

The OR gates 541*a*, 542*a*, and 543*a* may generate second selection signals SEL2, SEL3 and SELA for selecting respective one of the second registers 512, 513 and 514 by performing an OR operation on the first selection signal SEL1 and respective one of the intermediate selection signals ISEL1, ISL2 and ISEL3.

Figure 8A:
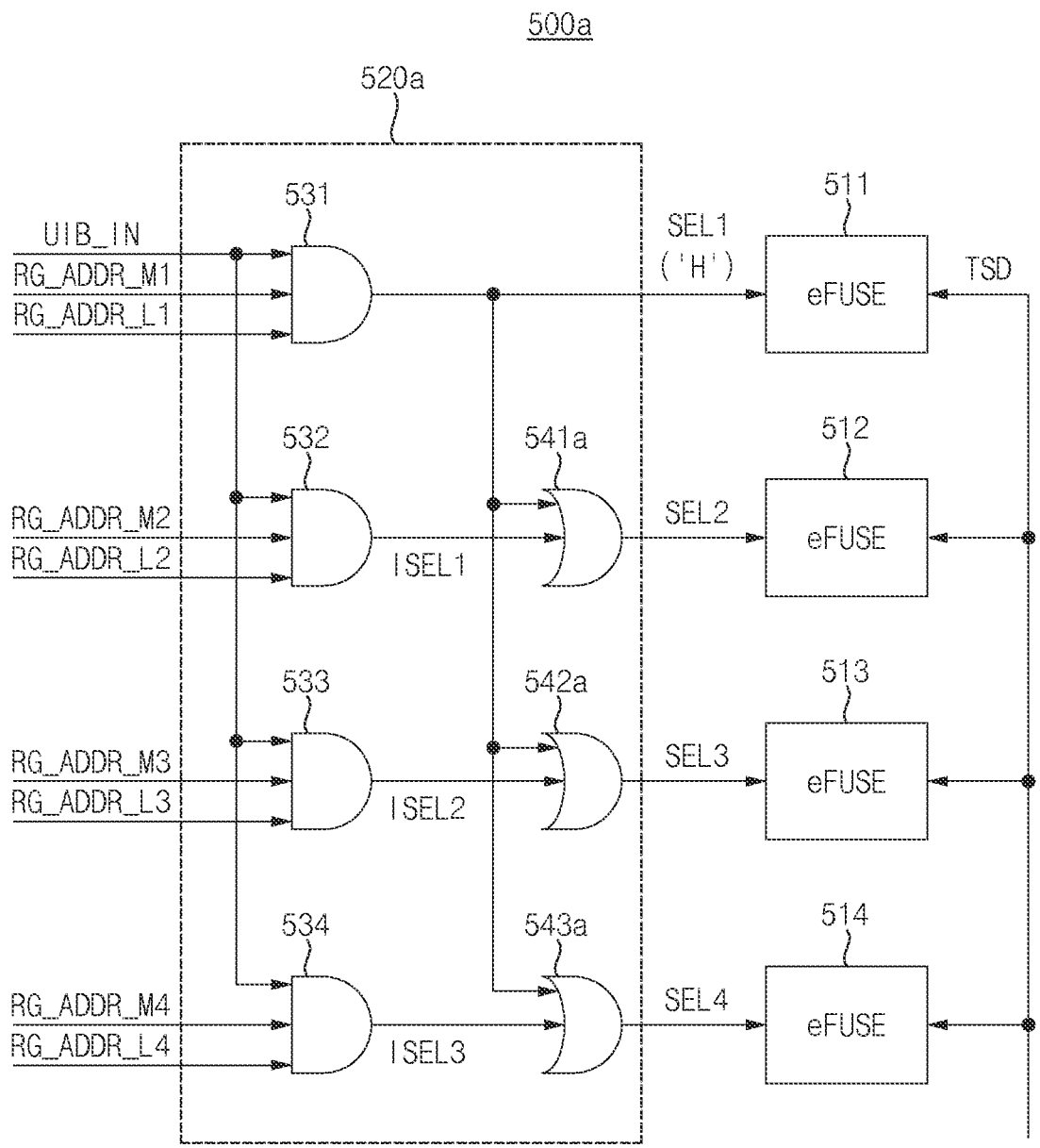
FIG. 8A is a diagram illustrating an example operation of the secure buffer of FIG. 7 according to some implementations.

FIG. 8A illustrates an example operation of the secure buffer of FIG. 7 according to some implementations.

In FIG. 8A, assume that the first register 511 is accessed.

Referring to FIG. 8A, when the first selection signal SEL1 is activated with a logic high level ('H'), each of the second selection signals SEL2, SEL3 and SEL4 is activated by the OR gates 541*a*, 542*a* and 543*a*. Therefore, when the first register 511 is accessed and a first setting data stored in the first register 511 is changed into a target setting data TSD, the access control circuit 520*a* may change a respective setting data stored in each of the second registers 512, 513 and 514 into the target setting data TSD by accessing the second registers 512, 513 and 514 concurrently with accessing the first register 511.

Figure 8B:
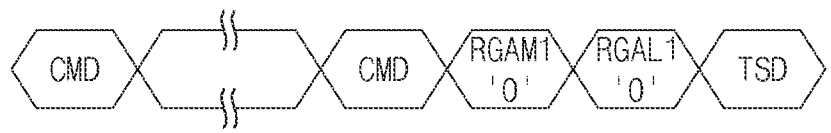
FIG. 8B illustrates signals associated with accessing the first register in FIG. 8A.

FIG. 8B illustrates signals associated with accessing the first register in FIG. 8A.

Referring to FIG. 8B, the first register 511 is accessed based on consecutive commands CMD, . . . , CMD corresponding to the register access mode signal UIB_IN, and bits RGAM1 and RGAL1 of a register address designating the first register 511 having value '00', and the first setting data stored in the first register 511 is changed into the target setting data TSD.

Figure 9:
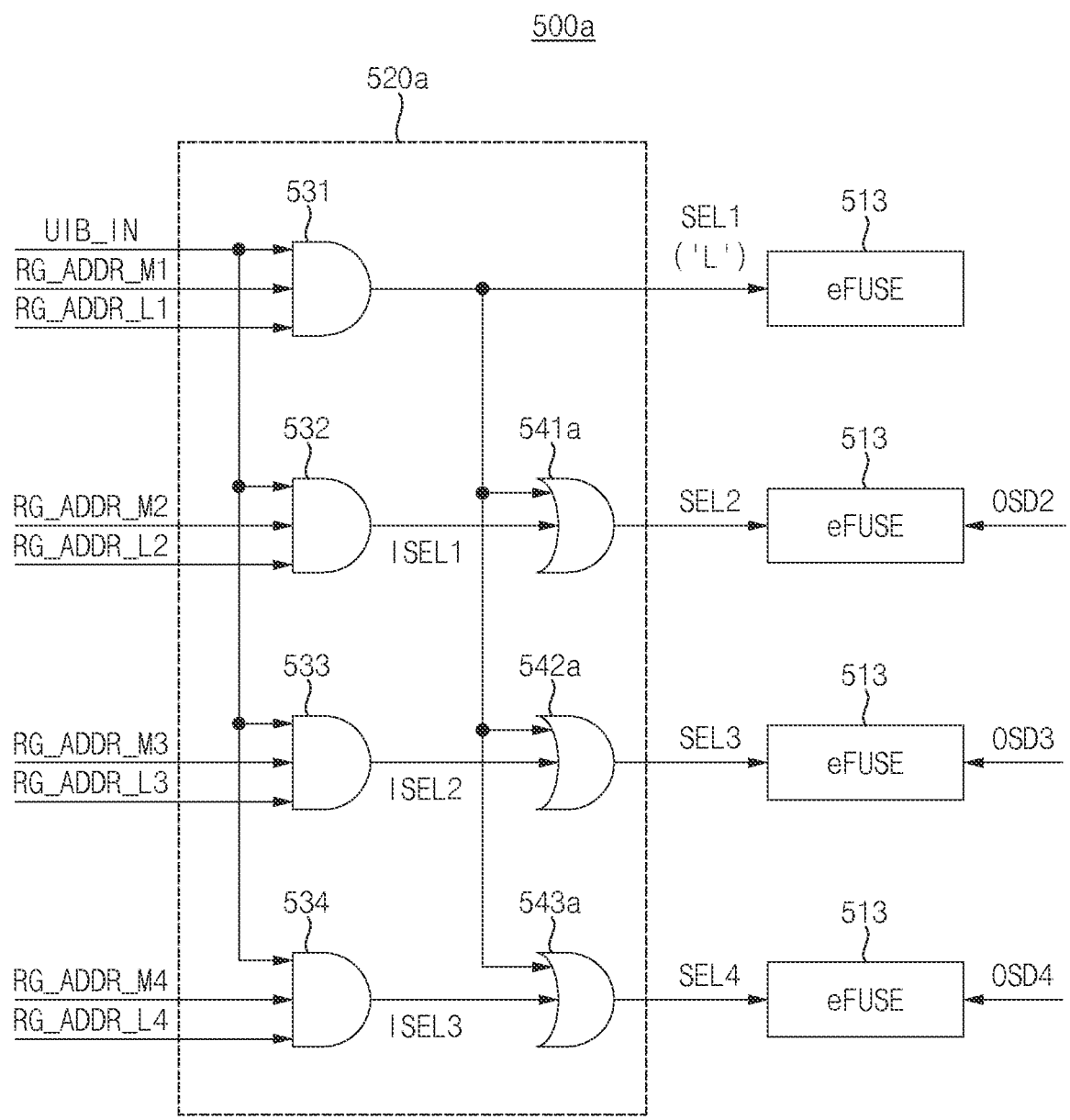
FIG. 9 is a diagram illustrating an example in which the changed setting data of the second registers are recovered in the secure buffer of FIG. 8A.

FIG. 9 illustrates an example in which the changed setting data of the second registers are recovered in the secure buffer of FIG. 8A.

In FIG. 9, descriptions repeated with FIG. 8A will be omitted.

Referring to FIG. 9, the access control circuit 520*a* deactivates first selection signal SEL1 with a logic low level ('L'), after the first setting data stored in the first register 511 is changed into the target setting data TSD. After deactivating the first selection signal SEL1, the access control circuit 520*a* sequentially activates the second selection signals SEL2, SEL3 and SEL4 by sequentially changing bits RGAM2 and RGAL2, RGAM3 and RGAL3 and RGAM4 and RGAL4 of the second register addresses to activate the intermediate selection signals ISEL1, ISL2 and ISEL3 sequentially.

The access control circuit 520*a* sequentially accesses the second registers 512, 513 and 514 by sequentially activating the second selection signals SEL2, SEL3 and SEL4 and may recover the target setting data TSD stored in each of the second registers 512, 513 and 514 to respective one of the original setting data OSD2, OSD3 and OSD4.

The control circuit 450 in FIG. 5 may perform a core operation on the memory cell array 405 based on the target setting data TSD stored in the first register 511 and the original setting data OSD2, OSD3 and OSD4 stored in the second registers 512, 513 and 514.

Figure 10:
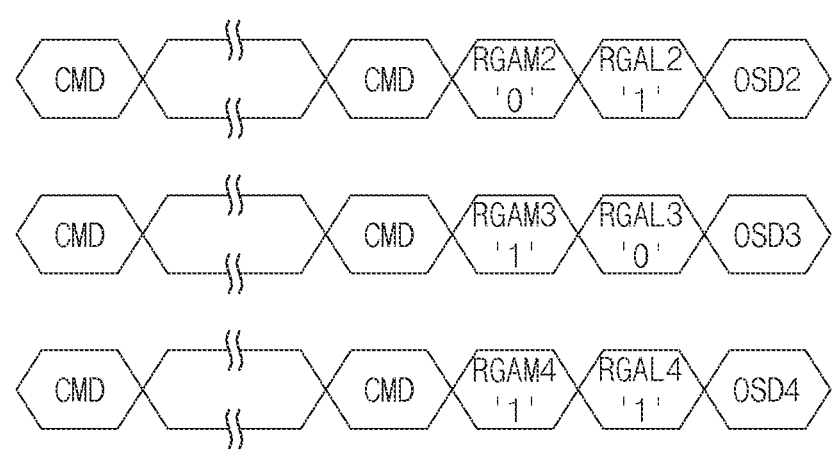
FIG. 10 illustrates signals associated with accessing the second registers in FIG. 9.

FIG. 10 illustrates signals associated with accessing the second registers in FIG. 9.

Referring to FIG. 10, the second register 512 is accessed (e.g., selected) based on consecutive commands CMD, . . . , CMD corresponding to the register access mode signal UIB_IN, and bits RGAM2 and RGAL2 of the second register address designating the second register 512 having value '01', and the target setting data TSD stored in the second register 512 is changed into the original setting data OSD2.

The second register 513 is accessed (e.g., selected) based on consecutive commands CMD, . . . , CMD corresponding to the register access mode signal UIB_IN, and bits RGAM3 and RGAL3 of the second the register address designating the second register 513 having '10', and the target setting data TSD stored in the second register 513 is changed into the original setting data OSD3.

The second register 514 is accessed (e.g., selected) based on consecutive commands CMD, . . . , CMD corresponding to the register access mode signal UIB_IN, and bits RGAM4 and RGAL4 of the second the register address designating the second register 514 having '11', and the target setting data TSD stored in the second register 514 is changed into the original setting data OSD4.

Figure 11A:
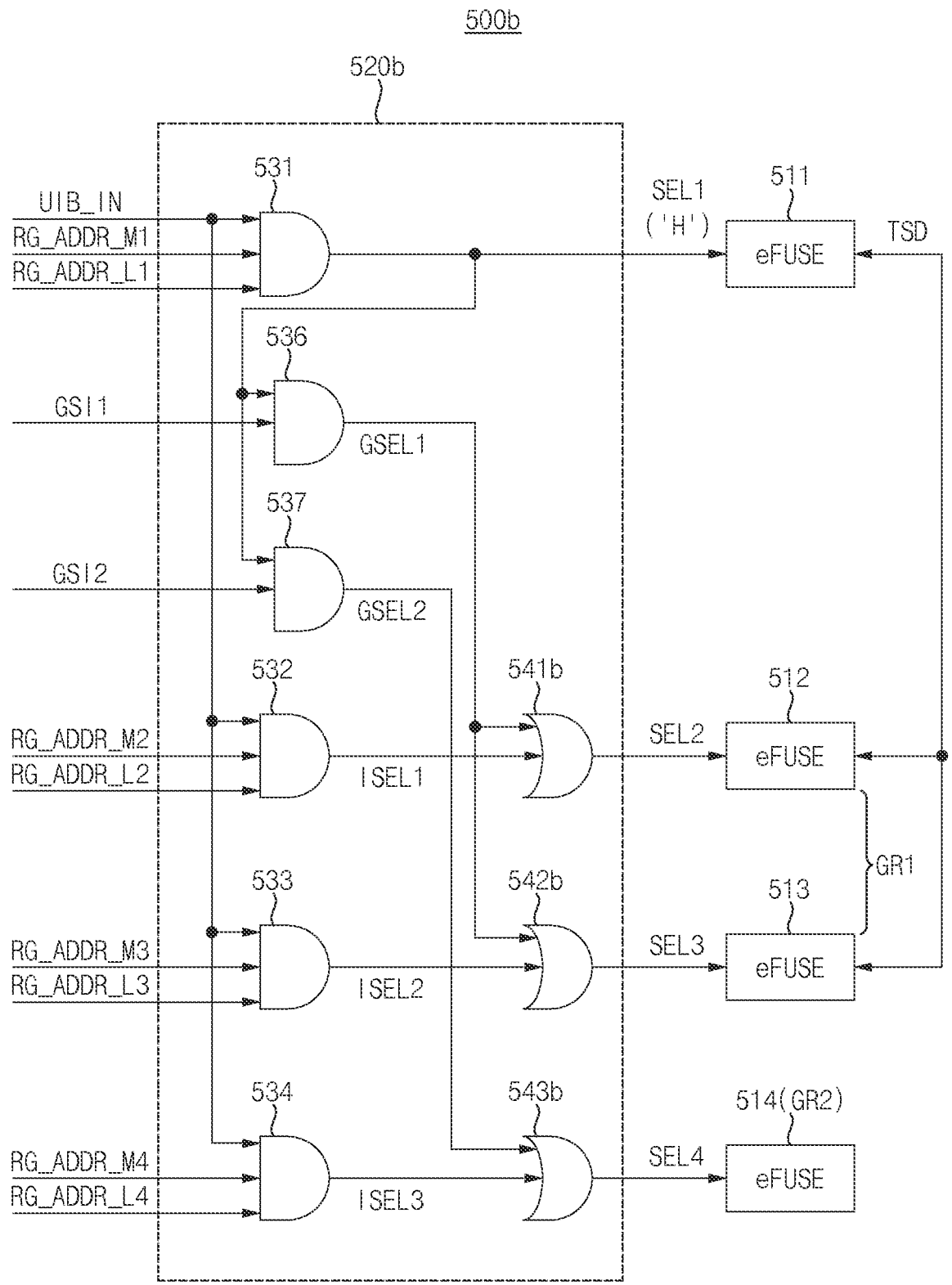
FIG. 11A is a block diagram illustrating an example of the secure buffer of FIG. 6 according to some implementations.

FIG. 11A is a block diagram illustrating an example of the secure buffer of FIG. 6 according to some implementations.

Referring to FIG. 11A, a secure buffer 500*b* may include a plurality of registers 511, 512, 513 and 514 with restricted access and an access control circuit 520*b*. Each of the plurality of registers 511, 512, 513 and 514 may be implemented with an e-fuse and the plurality of registers 511, 512, 513 and 514 may include a first register 511 and second registers 512, 513 and 514.

The access control circuit 520*b* may include a first AND gate 531, second AND gates 532, 533 and 534, third AND gates 536 and 537 and OR gates 541*b*, 542*b* and 543*b*. The access control circuit 520b may group the second registers 512, 513 and 514 into at least two groups.

The first AND gate 531 may generate a first selection signal SEL1 for selecting the first register 511 based on the register access mode signal UIB_IN and bits RG_ADDR_M1 and RG_ADDR_L1 of a first register address designating the first register 511.

The second AND gate 532 may generate an intermediate selection signal ISEL1 associated with selecting the second register 512 based on the register access mode signal UIB_IN and bits RG_ADDR_M2 and RG_ADDR_L2 of a second register address designating the second register 512. The second AND gate 533 may generate an intermediate selection signal ISEL2 associated with selecting the second register 513 based on the register access mode signal UIB_IN and bits RG_ADDR_M3 and RG_ADDR_L3 of a second register address designating the second register 513. The second AND gate 534 may generate an intermediate selection signal ISEL3 associated with selecting the second register 514 based on the register access mode signal UIB_IN and bits RG_ADDR_M4 and RG_ADDR_L4 of a second register address designating the second register 514.

The third AND gates 536 and 537 may generate group selection signals GSEL1 and GSEL2 for selecting respective ones of the at least two groups GR1 and GR2 based on group selection information GSI1 and GSI2. The group selection information GSI1 and GSI2 may be determined based on a combination of consecutive commands that are applied after the original setting data OSD is dumped-down.

The OR gates 541b, 542b and 543b may generate second selection signals SEL2, SEL3 and SEL4 for selecting respective one of the second registers 512, 513 and 514 by performing an OR operation on the first selection signal SEL1, one of the group selection signals GSEL1 and GSEL2 and respective one of the intermediate selection signals ISEL1, ISEL2 and ISEL3.

In the example of FIG. 11A, the access control circuit 520b groups the second registers 512, 513 and 514 into two groups including a first group GR1 selected by the group selection signal GSEL1 and a second group GR2 selected by the group selection signal GSEL2. The first group GR1 may include the second registers 512 and 513 and the second group GR2 may include the second register 514.

When the first selection signal SEL1 is activated with a logic high level ('H') and the group selection signal GSEL1 is activated with a logic high level, each of the second selection signals SEL2 and SEL3 is activated by the OR gates 541b and 542b. Therefore, when the first registers 511 is accessed and a first setting data stored in the first register 511 is changed into the target setting data TSD, the access control circuit 520b may change a respective setting data stored in each of the second registers 512 and 513 into the target setting data TSD by accessing the second registers 512 and 513 concurrently with accessing the first register 511.

In addition, although not illustrated, when the first selection signal SEL1 is activated with a logic high level ('H') and the group selection signal GSEL2 is activated with a logic high level, the second selection signal SEL4 is activated by the OR gates 543b. Therefore, when the first registers 511 is accessed and a first setting data stored in the first register 511 is changed into the target setting data TSD, the access control circuit 520b may change a setting data stored in the second register 514 into the target setting data TSD by accessing the second register 514 concurrently with accessing the first register 511.

The access control circuit 520b may select one of the first group GR1 and the second group GR2 based on a number of the consecutive commands that are applied after the original setting data OSD is dumped-down. For example, in some implementations, when the number of the consecutive commands that are applied after the original setting data OSD is dumped-down is an odd number, the access control circuit 520b may select the first group GR1, and when the number of the consecutive commands that are applied after the original setting data OSD is dumped-down is an even number, the access control circuit 520b may select the second group GR2. In some implementations, when the number of the consecutive commands that are applied after the original setting data OSD is dumped-down is an even number, the access control circuit 520b may select the first group GR1, and when the number of the consecutive commands that are applied after the original setting data OSD is dumped-down isan odd number, the access control circuit 520b may select the second group GR2.

That is, the access control circuit 520b may group the second registers 512, 513 and 514 into at least two groups. When the first register 511 is accessed and the first setting data stored in the first register 511 is changed, the access control circuit 520b may change a setting data stored in at least one of the two groups by accessing the second registers in the at least one of the two groups concurrently with accessing the first register 511.

As described with reference to FIG. 10, the changed setting data stored in at least one of the two groups, which is accessed concurrently with the first register 511, may be recovered to corresponding original setting data by accessing the registers in at least one of the two groups individually.

Figure 11B:
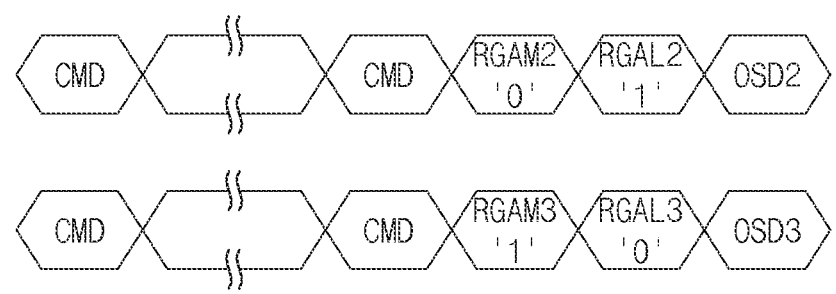
FIG. 11B illustrates signals associated with accessing the registers in the first group in FIG. 11A.

FIG. 11B illustrates signals associated with accessing the registers in the first group in FIG. 11A.

Referring to FIG. 11B, the second register 512 is accessed (e.g., selected) based on consecutive commands CMD, . . . , CMD corresponding to the register access mode signal UIB_IN, and bits RGAM2 and RGAL2 of the second register address designating the second register 512 having value '01', and the target setting data TSD stored in the second register 512 is changed into the original setting data OSD2.

The second register 513 is accessed (e.g., selected) based on consecutive commands CMD, . . . , CMD corresponding to the register access mode signal UIB_IN, and bits RGAM3 and RGAL3 of the second the register address designating the second register 513 having value '10', and the target setting data TSD stored in the second register 513 is changed into the original setting data OSD3.

Figure 11C:
FIG. 11C illustrates signals associated with accessing the register in the second group in FIG. 11A.

FIG. 11C illustrates signals associated with accessing the register in the second group in FIG. 11A.

Referring to FIG. 11C, the second register 514 is accessed (e.g., selected) based on consecutive commands CMD, . . . , CMD corresponding to the register access mode signal UIB_IN, and bits RGAM4 and RGAL4 of the second the register address designating the second register 514 having value '11', and the target setting data TSD stored in the second register 514 is changed into the original setting data OSD4.

Figure 12A:
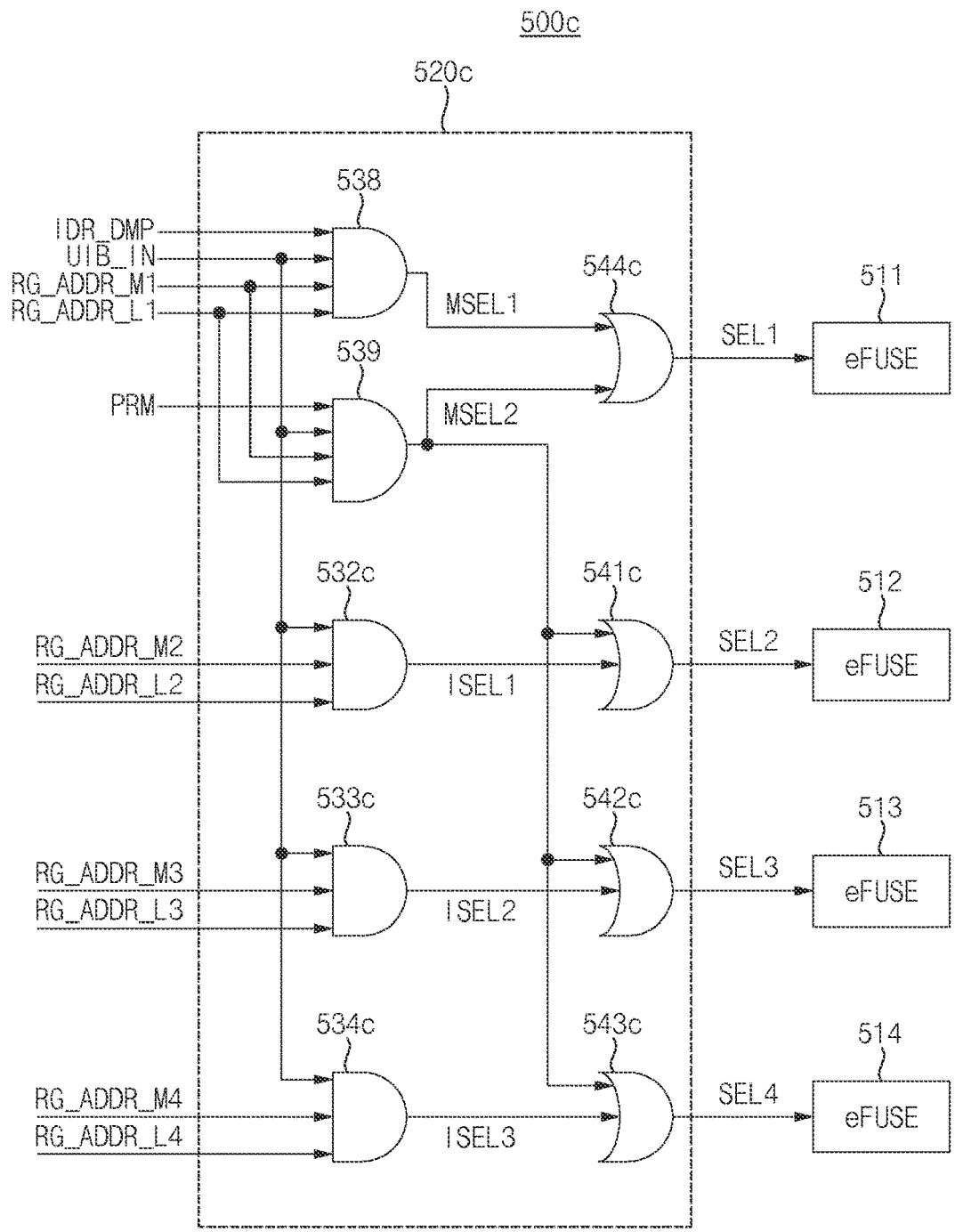
FIG. 12A is a block diagram illustrating an example of the secure buffer of FIG. 6 according to some implementations.

FIG. 12A is a block diagram illustrating an example of the secure buffer of FIG. 6 according to some implementations.

Referring to FIG. 12A, a secure buffer 500c may include a plurality of registers 511, 512, 513 and 514 with restricted access and an access control circuit 520c. Each of the plurality of registers 511, 512, 513 and 514 may be implemented with an e-fuse and the plurality of registers 511, 512, 513 and 514 may include a first register 511 and second registers 512, 513 and 514.

When the first register 511 is accessed and a first setting data stored in the first register 511 is changed, the access control circuit 520c may cut off access to the second registers 512, 513 and 514 in a first mode and may change a respective setting data stored in each of the second registers 512, 513 and 514 by accessing the second registers 512, 513 and 514 concurrently with accessing the first register 511 in a second mode.

The access control circuit 520c may include a first AND gate 538, a second AND gate 539, third AND gates 532c, 533c and 534c, a first OR gate 544c and second OR gates 541c, 542c and 543c.

The first AND gate 538 may generate a first mode selection signal MSEL1 that is activated in the first mode based on a setting data dump signal IDR_DMP designating the first mode, the register access mode signal UIB_IN and bits RG_ADDR_M1 and RG_ADDR_L1 of a first register address designating the first register 511.

The second AND gate 539 may generate a second mode selection signal MSEL2 that is activated in the second mode based on a pin reduction mode signal PRM designating the second mode, the register access mode signal UIB_IN and the bits RG_ADDR_M1 and RG_ADDR_L1 of the first register address designating the first register 511.

The third AND gate 532c may generate an intermediate selection signal ISEL1 associated with selecting the second register 512 based on the register access mode signal UIB_IN and bits RG_ADDR_M2 and RG_ADDR_L2 of a second register address designating the second register 512. The third AND gate 533c may generate an intermediate selection signal ISEL2 associated with selecting the second register 513 based on the register access mode signal UIB_IN and bits RG_ADDR_M3 and RG_ADDR_L3 of a second register address designating the second register 513. The third AND gate 534c may generate an intermediate selection signal ISEL3 associated with selecting the second register 514 based on the register access mode signal UIB_IN and bits RG_ADDR_M4 and RG_ADDR_L4 of a second register address designating the second register 514.

The first OR gate 544c may generate a first selection signal SEL for selecting the first register 511 by performing an OR operation on the first mode selection signal MSEL1 and the second mode selection signal MSEL2.

The second OR gates 541c, 542c and 542c may generate second selection signals SEL2, SEL3 and SEL4 for selecting respective one of the second registers 512, 513 and 514 by performing an OR operation on the second mode selection signal MSEL2 and respective ones of the intermediate selection signals ISEL1, ISEL2 and ISEL3.

Therefore, the access control circuit 520c may cut off access to the second registers 512, 513 and 514 in the first mode in which the original setting data is dumped-down by activating the first mode selection signal MSEL1 and by deactivating the second mode selection signal MSEL2 when the first register 511 is accessed.

In addition, the access control circuit 520c may permit access to the second registers 512, 513 and 514 in the second mode in which a test is performed on the nonvolatile memory device 400 by deactivating the first mode selection signal MSEL1 and by activating the second mode selection signal MSEL2 when the first register 511 is accessed. Signals associated with the test in the second mode may be input to a specific pin of the nonvolatile memory device 400 (e.g., a pin reduction mode).

The register access mode signal UIB_IN, the group selection information GSI1 and GSI2, the setting data dump signal IDR_DMP and the pin reduction mode signal PRM in FIGS. 6 through 12A may be included in the buffer control signal BCTL in FIG. 5.

Figure 12B:
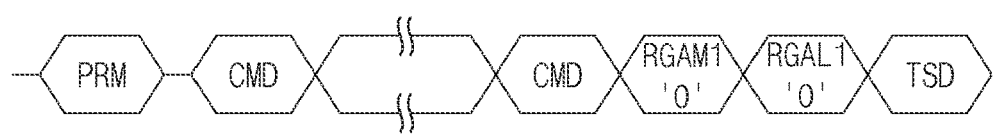
FIG. 12B illustrates signals associated with accessing the first register in FIG. 12A.

FIG. 12B illustrates signals associated with accessing the first register in FIG. 12A.

Referring to FIG. 12B, the first register 511 is accessed based on the pin reduction mode signal PRM, consecutive commands CMD, . . . , CMD corresponding to the register access mode signal UIB_IN and bits RGAM1 and RGAL1 of a register address designating the first register 511 having value '00', and the first setting data stored in the first register 511 is changed into the target setting data TSD. The second selection signals SEL2, SEL3 and SEL4 for selecting the second registers 512, 513 and 514 may be activated concurrently with the first selection signal SEL1 being activated.

The pin reduction mode signal PRM in FIGS. 12A and 12B may be activated in wafer parallel test mode on the nonvolatile memory device 400. For example, the pin reduction mode may correspond to a wafer parallel test mode on the nonvolatile memory device 400.

Figures 13, 14:
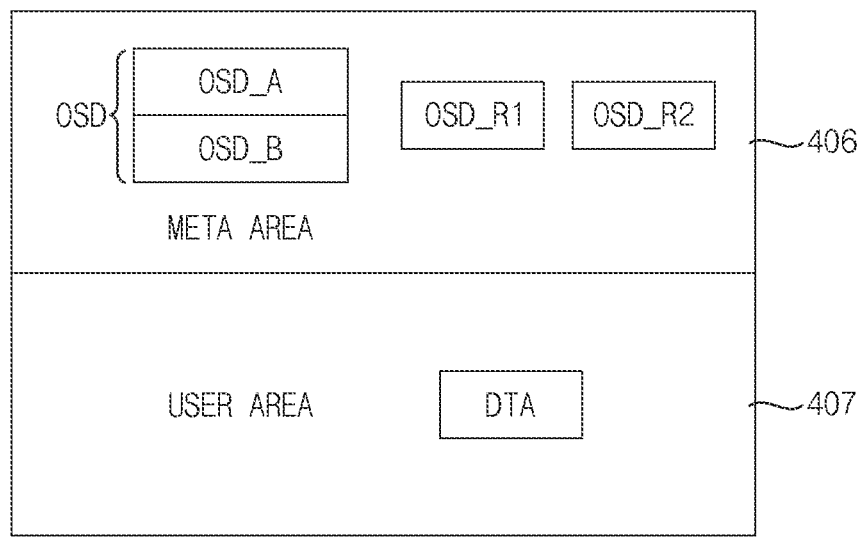
FIG. 13 is a diagram illustrating an example of the memory cell array in the nonvolatile memory device of FIG. 5 according to some implementations.
FIG. 14 illustrates an example of the original setting data according to some implementations.

FIG. 13 illustrates an example of the memory cell array in the nonvolatile memory device of FIG. 5 according to some implementations.

Referring to FIG. 13, the memory cell array 405 may include a meta area 406 and a user area 407.

The meta area 406 may include the original setting data OSD and replica setting data OSD_R1 and OSD_R2 that are generated by replicating the original setting data OSD. The user area 407 may store a user data DTA.

The original setting data OSD may include a first type of setting data OSD_A and a second type of setting data OSD_B.

FIG. 14 illustrates an example of the original setting data according to some implementations.

Referring to FIG. 14, the first type of setting data OSD_A may include performance parameters related to the nonvolatile memory device 400, and the second type of setting data OSD_B may include reliability parameters related to the non-volatile memory device 400.

In some implementations, the performance parameters may include a read time tR, a program time tPROG, an erase time tERS, and/or the like. In some implementations, the reliability parameters may include a retention-related parameter, an endurance-related parameter, a width and level of a step pulse of an incremental step pulse program (ISPP), a recovery voltage, a verification method, the number of verification target states, and/or the like. It should be understood that the performance parameters and the reliability parameters of the present disclosure are not limited thereto.

Figure 15:
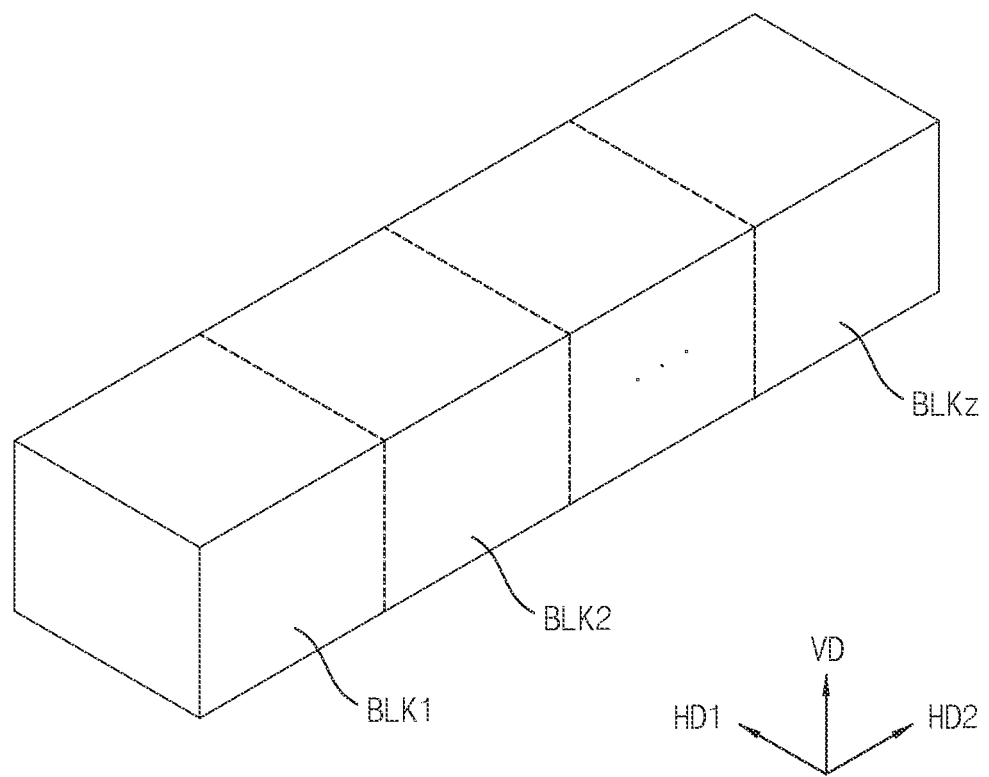
FIG. 15 is a block diagram illustrating an example of the memory cell array in the nonvolatile memory device of FIG. 5 according to some implementations.

FIG. 15 is a block diagram illustrating an example of the memory cell array in the nonvolatile memory device of FIG. 5 according to some implementations.

Referring to FIG. 15, the memory cell array 405 may include a plurality of memory blocks BLK1 to BLKz which extend along a first direction HD1 (e.g., a first horizontal direction), a second direction HD2 (e.g., a second horizontal direction) and a third direction VD (e.g., a vertical direction). Here, z may be a natural number greater than two. In some implementations, the memory blocks BLK1 to BLKz are selected by the address decoder 430 in FIG. 5. For example, the address decoder 430 may select a memory block BLK corresponding to a block address among the memory blocks BLK1 to BLKz.

Figure 16:
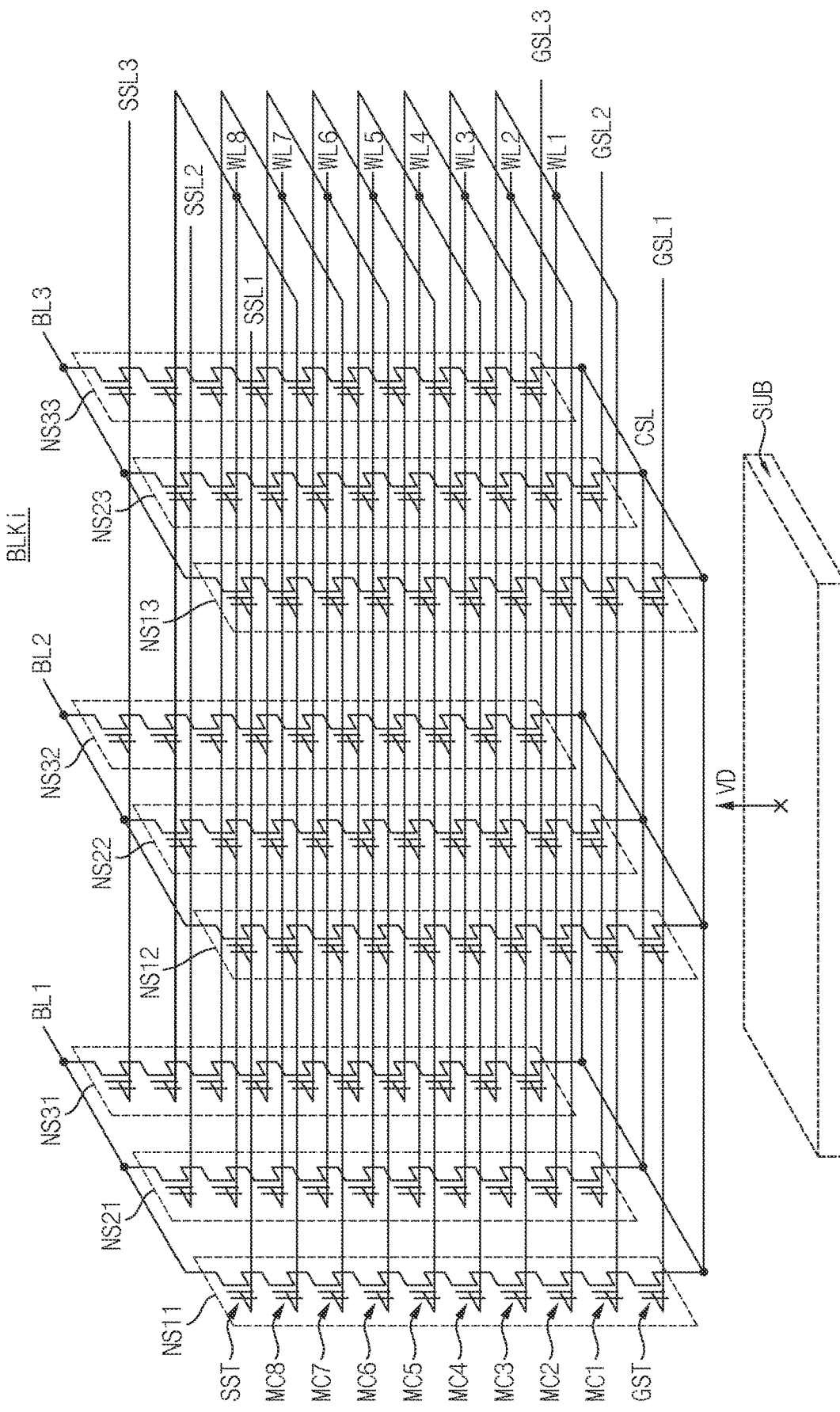
FIG. 16 is a circuit diagram illustrating one of the memory blocks of FIG. 15.

FIG. 16 is a circuit diagram illustrating one of the memory blocks of FIG. 15.

The memory block BLKi of FIG. 16 may be formed on a substrate SUB in a three-dimensional structure (or a vertical structure). For example, a plurality of memory cell strings included in the memory block BLKi may be formed in the third direction VD perpendicular to the substrate SUB.

Referring to FIG. 16, the memory block BLKi may include (memory) cell strings NS11 to NS33 coupled between bit-lines BL1, BL2 and BL3 and a common source line CSL. Each of the cell strings NS11 to NS33 may include a string selection transistor SST, a plurality of memory cells MC1 to MC8, and a ground selection transistor GST. In FIG. 12, each of the cell strings NS11 to NS33 is illustrated to include eight memory cells MC1 to MC8. However, the present disclosure is not limited thereto. In some implementations, each of the cell strings NS11 to NS33 may include any number of memory cells.

The string selection transistor SST may be connected to corresponding string selection lines SSL1 to SSL3. The plurality of memory cells MC1 to MC8 may be connected to corresponding word-lines WL1 to WL8, respectively. The ground selection transistor GST may be connected to corresponding ground selection lines GSL1 to GSL3. The string selection transistor SST may be connected to corresponding bit-lines BL1, BL2 and BL3, and the ground selection transistor GST may be connected to the common source line CSL.

Word-lines (e.g., WL1) having the same height may be commonly connected, and the ground selection lines GSL1 to GSL3 and the string selection lines SSL1 to SSL3 may be separated.

Figure 17:
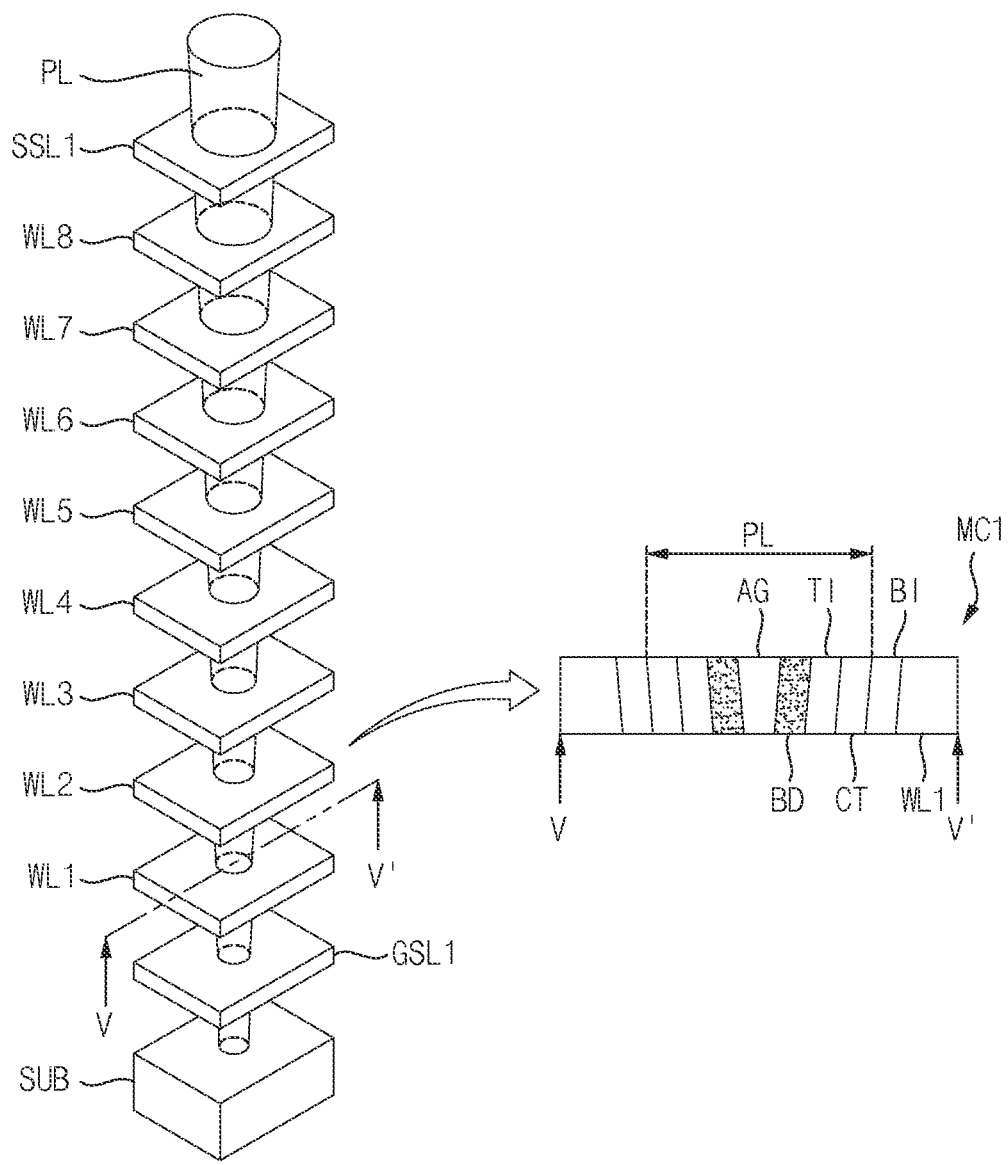
FIG. 17 is a diagram illustrating an example of a structure of a cell string in the memory block of FIG. 16.

FIG. 17 illustrates an example of a structure of a cell string in the memory block of FIG. 16.

Referring to FIGS. 16 and 17, in the cell string NS11, a pillar PL is provided on the substrate SUB such that the pillar PL extends in a direction perpendicular to the substrate SUB to make contact with the substrate SUB. Each of the ground selection line GSL1, the word-lines WL1 to WL8, and the string selection lines SSL1 illustrated in FIG. 17 may be formed of a conductive material parallel with the substrate SUB, for example, a metallic material. The pillar PL may be in contact with the substrate SUB through the conductive materials forming the string selection lines SSL, the word-lines WL1 to WL8, and the ground selection line GSL.

A sectional view taken along a line V-V' is also illustrated in FIG. 17. In some implementations, a sectional view of a first memory cell MC1 corresponding to a first word-line WL1 is illustrated. The pillar PL may include a cylindrical body BD. An air gap AG may be defined in the interior of the body BD.

The body BD may include P-type silicon and may be an area where a channel will be formed. The pillar PL may further include a cylindrical tunnel insulating layer TI surrounding the body BD and a cylindrical charge trap layer CT surrounding the tunnel insulating layer TI. A blocking insulating layer BI may be provided between the first word-line WL1 and the pillar PL. The body BD, the tunnel insulating layer TI, the charge trap layer CT, the blocking insulating layer BI, and the first word-line WL1 may constitute or be included in a charge trap type transistor that is formed in a direction perpendicular to the substrate SUB or to an upper surface of the substrate SUB. A string selection transistor SST, a ground selection transistor GST, and other memory cells may have the same structure as the first memory cell MC1.

Figure 18:
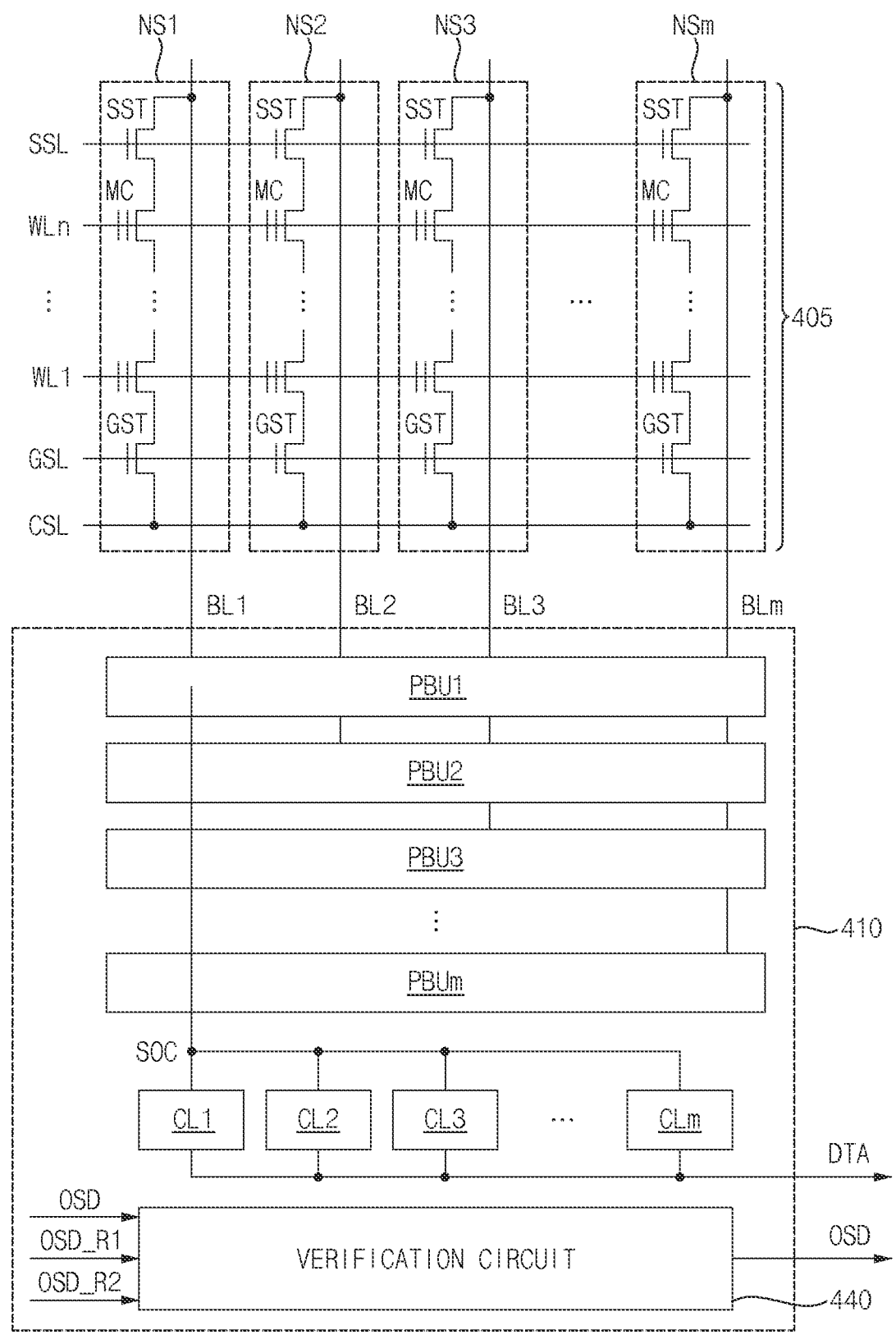
FIG. 18 is a schematic diagram of a connection of the memory cell array to the page buffer circuit in FIG. 5, according to some implementations.

FIG. 18 is a schematic diagram of a connection of the memory cell array to the page buffer circuit in FIG. 5, according to some implementations.

Referring to FIG. 18, the memory cell array 405 may include first through m-th cell strings NS1, NS2, NS3, ... , NSm, each of the first through m-th cell strings NS1, NS2, NS3, ... , NSm may include a ground select transistor GST connected to the ground select line GSL, a plurality of memory cells MC respectively connected to the first through n-th word-lines WL1, ... , WLn, and a string select transistor SST connected to the string select line SSL, and the ground select transistor GST, the plurality of memory cells MC, and the string select transistor SST may be connected to each other in series. In this case, n may be a positive integer greater than three.

The page buffer circuit 410 may include first through m-th page buffer units PBU1, PBU2, PBU3, ... , PBUm. The first page buffer unit PB1 may be connected to the first cell string NS1 via the first bit-line BL1, and the m-th page buffer unit PBUm may be connected to the m-th cell string NSm via the m-th bit-line BLm. For example, m may be 8, and the page buffer circuit 410 may have a structure in which page buffer units of eight stages, or, the first through m-th page buffer units PBU1, PBU2, PBU3, ... , PBUm, are in a line. For example, the first through m-th page buffer units PBU1, PBU2, PBU3, ... , PBUm may be in a row in an extension direction of the first through m-th bit-lines BL1, BL2, BL3, ... , BLm.

The page buffer circuit 410 may further include first through m-th cache latches CL1, CL2, CL3, ... , CLm respectively corresponding to the first through m-th page buffer units PBU1, PBU2, PBU3, ... , PBUm. For example, the page buffer circuit 410 may have a structure in which the cache latches of eight stages or the first through m-th cache latches CL1, CL2, CL3, ... , CLm in a line. For example, the first through m-th cache latches CL1, CL2, CL3, ... , CLm may be in a row in an extension direction of the first through m-th bit-lines BL1, BL2, BL3, ... , BLm.

The sensing nodes of each of the first through m-th page buffer units PBU1, PBU2, PBU3, ... , PBUm may be commonly connected to a combined sensing node SOC. In addition, the first through m-th cache latches CL1, CL2, CL3, ... , CLm may be commonly connected to the combined sensing node SOC. Accordingly, the first through m-th page buffer units BU1, PBU2, PBU3, ... , PBUm may be connected to the first through m-th cache latches CL1, CL2, CL3, ... , CLm via the combined sensing node SOC. The first through m-th cache latches CL1, CL2, CL3, ... , CLm may output a hard decision data HDRD.

The page buffer circuit 410 may further include a verification circuit 440.

The verification circuit 440 may verify the original setting data OSD based on the original setting data OSD and the replica setting data OSD_R1 and OSD_R2 that are stored in the memory cell array 405 and are sensed by first through m-th page buffer units PBU1, PBU2, PBU3, ... , PBUm and may provide the verified original setting data OSD to the secure buffer 500 shown in FIG. 5.

The verification circuit 440 may perform a majority voting operation on the original setting data OSD and the replica setting data OSD_R1 and OSD_R2 and may verify the original setting data OSD based on a result of the majority voting operation.

Figure 19:
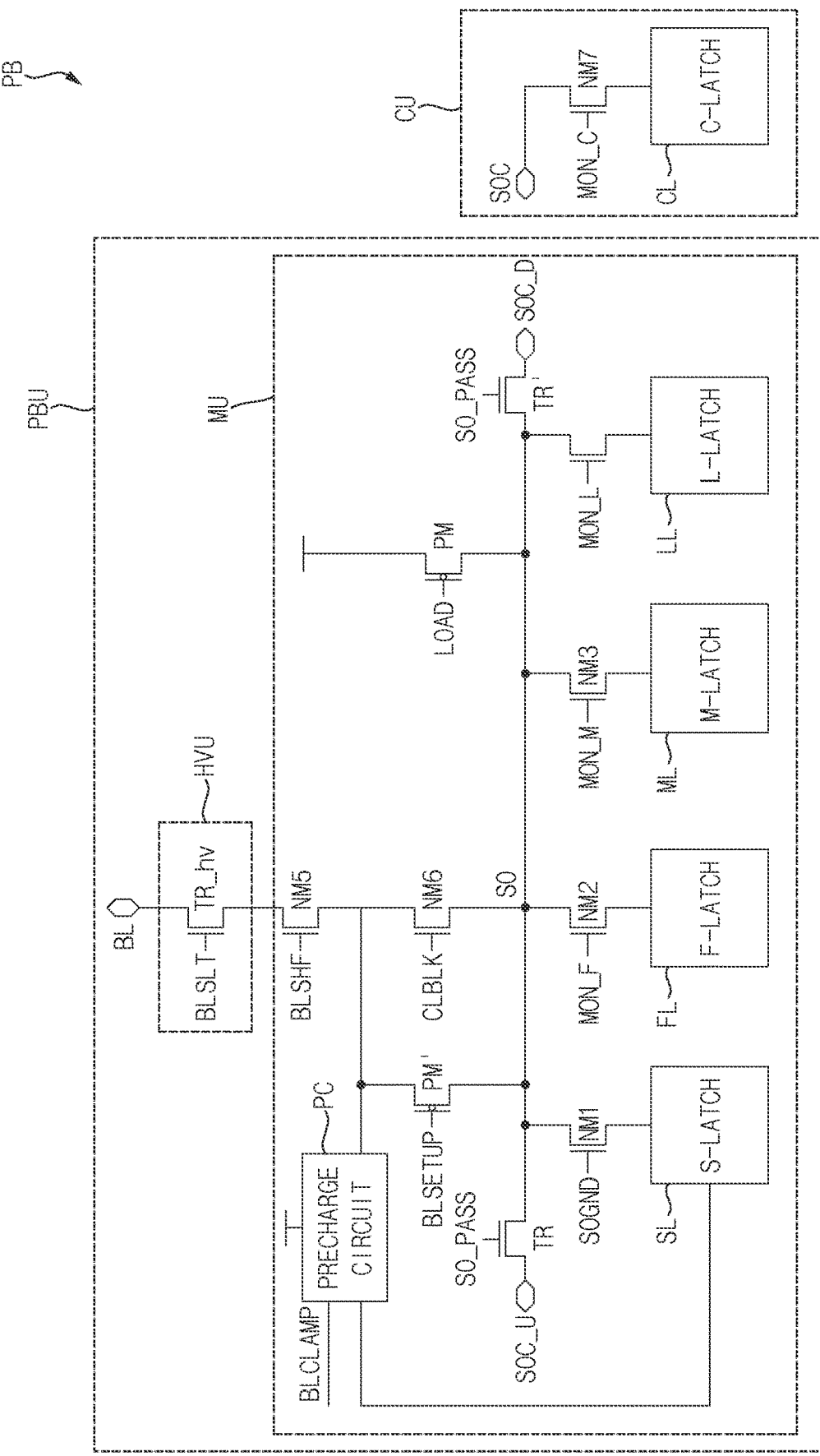
FIG. 19 is a diagram illustrating a page buffer according to some implementations.

FIG. 19 illustrates a page buffer in detail according to some implementations.

Referring to FIG. 19, the page buffer PB may correspond to an example of the page buffer PB in FIG. 5. The page buffer PB may include a page buffer unit PBU and a cache unit CU. Because the cache unit CU includes a cache latch (C-LATCH) CL, and the C-LATCH CL is connected to a data input/output line, the cache unit CU may be adjacent to the data input/output line. Accordingly, the page buffer unit PBU and the cache unit CU may be apart from each other, and the page buffer PB may have a structure in which the page buffer unit PBU and the cache unit CU are apart from each other.

The page buffer unit PBU may include a main unit MU. The main unit MU may include main transistors in the page buffer PB. The page buffer unit PBU may further include a bit-line selection transistor TR_hv that is connected to the bit-line BL and driven by a bit-line selection signal BLSLT. The bit-line select transistor TR_hv may include a high voltage transistor, and accordingly, the bit-line selection transistor TR_hv may be in a different well region from the main unit MU, for example, in a high voltage unit HVU.

The main unit MU may include a sensing latch (S-LATCH) SL, a force latch (F-LATCH) FL, an upper bit latch (M-LATCH) ML and a lower bit latch (L-LATCH) LL. In some implementations, the S-LATCH SL, the F-LATCH FL, the M-LATCH ML, or the L-LATCH LL may be referred to as main latches. The main unit MU may further include a precharge circuit PC capable of controlling a precharge operation on the bit-line BL or a sensing node SO based on a bit-line clamping control signal BLCLAMP, and may further include a transistor PM' driven by a bit-line setup signal BLSETUP.

The S-LATCH SL may, during a read or program verification operation, store data stored in a memory cell MC or a sensing result of a threshold voltage of the memory cell MC. In addition, the S-LATCH SL may, during a program operation, be used to apply a program bit-line voltage or a program inhibit voltage to the bit-line BL. The F-LATCH FL may be used to improve threshold voltage distribution during the program operation. The F-LATCH FL may store force data. After the force data is initially set to '1', the force data may be converted to '0' when the threshold voltage of the memory cell MC enters a forcing region that has a lower voltage than a target region. By utilizing the force data during a program execution operation, the bit-line voltage may be controlled, and the program threshold voltage distribution may be formed narrower.

The M-LATCH ML, the L-LATCH LL, and the C-LATCH CL may be utilized to store data externally input during the program operation, and may be referred to as data latches. When data of 3 bits is programmed in one memory cell MC, the data of 3 bits may be stored in the M-LATCH ML, the L-LATCH LL, and the C-LATCH CL, respectively. Until a program of the memory cell MC is completed, the M-LATCH ML, the L-LATCH LL, and the C-LATCH CL may maintain the stored data. In addition, the C-LATCH CL may receive data read from a memory cell MC during the read operation from the S-LATCH SL, and output the received data to the outside via the data input/output line.

In addition, the main unit MU may further include first through fourth transistors NM1 through NM4. The first transistor NM1 may be connected between the sensing node SO and the S-LATCH SL, and may be driven by a ground control signal SOGND. The second transistor NM2 may be connected between the sensing node SO and the F-LATCH FL, and may be driven by a forcing monitoring signal MON_F. The third transistor NM3 may be connected between the sensing node SO and the M-LATCH ML, and may be driven by a higher bit monitoring signal MON_M. The fourth transistor NM4 may be connected between the sensing node SO and the L-LATCH LL, and may be driven by a lower bit monitoring signal MON_L.

In addition, the main unit MU may further include fifth and sixth transistors NM5 and NM6 connected to each other in series between the bit-line selection transistor TV_hv and the sensing node SO. The fifth transistor NM5 may be driven by a bit-line shut-off signal BLSHF, and the sixth transistor NM6 may be driven by a bit-line connection control signal CLBLK. In addition, the main unit MU may further include a precharge transistor PM. The precharge transistor PM may be connected to the sensing node SO, driven by a load signal LOAD, and precharge the sensing node SO to a precharge level in a precharge period.

In some implementations, the main unit MU may further include a pair of pass transistors connected to the sensing node SO, or first and second pass transistors TR and TR'. In some implementations, the first and second pass transistors TR and TR' may also be referred to as first and second sensing node connection transistors, respectively. The first and second pass transistors TR and TR' may be driven in response to a pass control signal SO_PASS. In some implementations, the pass control signal SO_PASS may be referred to as a sensing node connection control signal. The first pass transistor TR may be connected between a first terminal SOC_U and the sensing node SO, and the second pass transistor TR' may be between the sensing node SO and a second terminal SOC_D.

For example, when the page buffer unit PBU corresponds to the second page buffer unit PBU2 in FIG. 18, the first terminal SOC_U may be connected to one end of the pass transistor included in the first page buffer unit PBU1, and the second terminal SOC_D may be connected to one end of the pass transistor included in the third page buffer unit PBU3. In this manner, the sensing node SO may be electrically connected to the combined sensing node SOC via pass transistors included in each of the third through m-th page buffer units PBU3 through PBUM.

During the program operation, the page buffer PB may verify whether the program is completed in a memory cell MC selected among the memory cells MC included in the NAND string connected to the bit-line BL. The page buffer PB may store data sensed via the bit-line BL during the program verify operation in the S-LATCH SL. The M-LATCH ML and the L-LATCH LL may be set in which target data is stored according to the sensed data stored in the S-LATCH SL.

For example, when the sensed data indicates that the program is completed, the M-LATCH ML and the L-LATCH LL may be switched to a program inhibit setup for the selected memory cell MC in a subsequent program loop. The C-LATCH CL may temporarily store input data provided from the outside. During the program operation, the target data to be stored in the C-LATCH CL may be stored in the M-LATCH ML and the L-LATCH LL.

The description herein assumes that signals for controlling elements in the page buffer circuit 410 are included in the page buffer control signal PCTL in FIG. 5.

Figure 20:
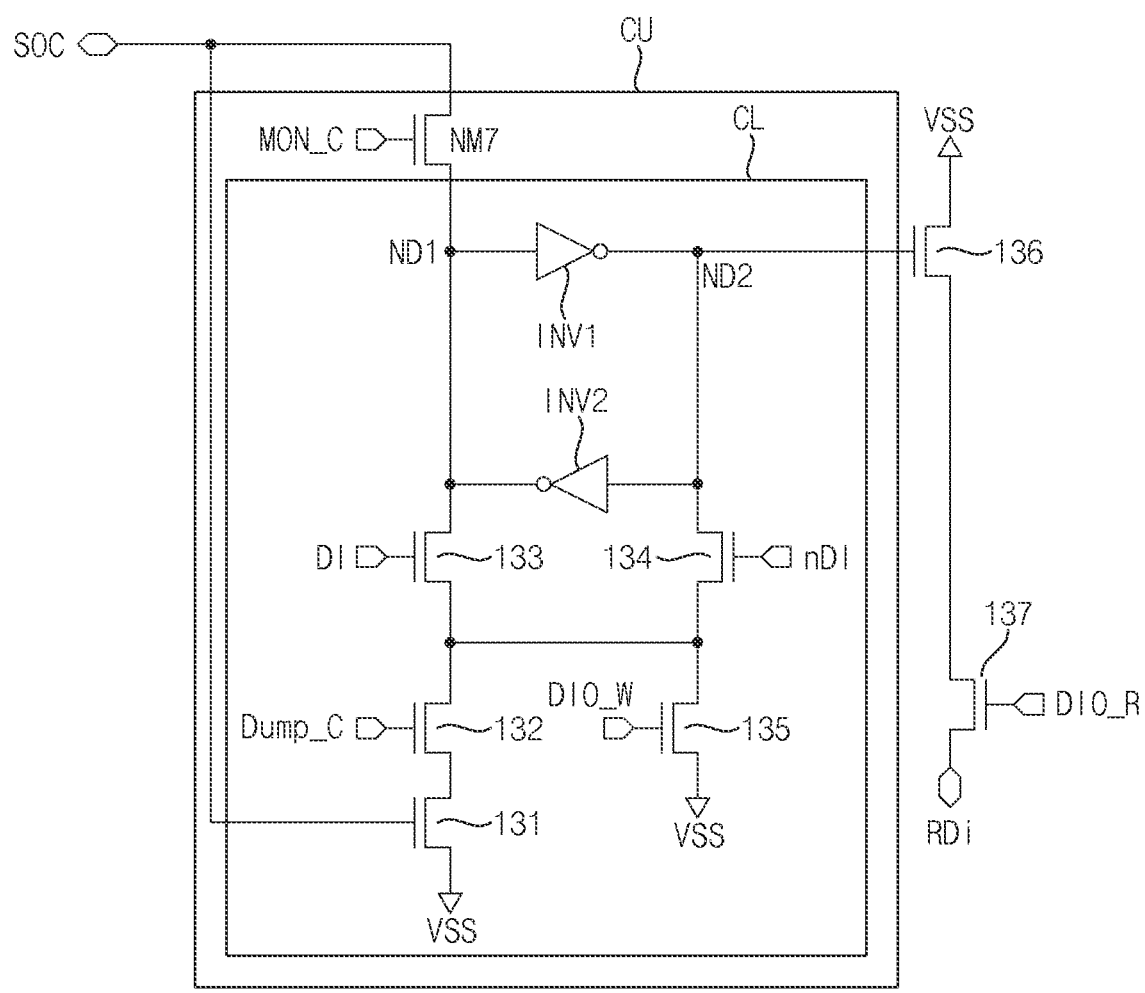
FIG. 20 is a circuit diagram illustrating an example of the cache unit according to some implementations.

FIG. 20 is a circuit diagram illustrating an example of the cache unit according to some implementations.

Referring to FIGS. 19 and 20, the cache unit CU may include the monitor transistor NM7 and the C-LATCH CL, and the C-LATCH CL may include first and second inverters INV1 and INV2, a dump transistor 132, and transistors 131 and 133 to 135. The monitor transistor NM7 may be driven based on the cache monitoring signal MON_C, and may control a connection between the coupling sensing node SOC and the C-LATCH CL.

The first inverter INV1 may be connected between the first node ND1 and the second node ND2, the second inverter INV2 may be connected between the second node ND2 and the first node ND1, and thus, the first and second inverters INV1 and INV2 may form a latch. The transistor 131 may include a gate connected to the combined sensing node SOC and may be connected between the dump transistor 132 and a ground voltage VSS.

The dump transistor 132 may be driven by a dump signal Dump_C, and may transmit data stored in the C-LATCH CL to a main latch, for example, the S-LATCH SL in the page buffer unit PBU. The transistor 133 may be driven by a data signal DI, the transistor 134 may be driven by a data inversion signal nDI, and the transistor 135 may be driven by a write control signal DIO_W. When the write control signal DIO_W is activated, voltage levels of the first and second nodes ND1 and ND2 may be determined based on the data signal DI and the data inversion signal nDI, respectively.

The cache unit CU may be connected to an data I/O line (or data I/O terminal) RDi via transistors 136 and 137. The transistor 136 may include a gate connected to the second node ND2, and may be turned on or off based on a voltage level of the second node ND2. The transistor 137 may be driven by a read control signal DIO_R. When the read control signal DIO_R is activated and the transistor 137 is turned on, a voltage level of the input/output terminal RDi may be determined as '1' or '0' based on a state of the C-LATCH CL.

Figure 21:
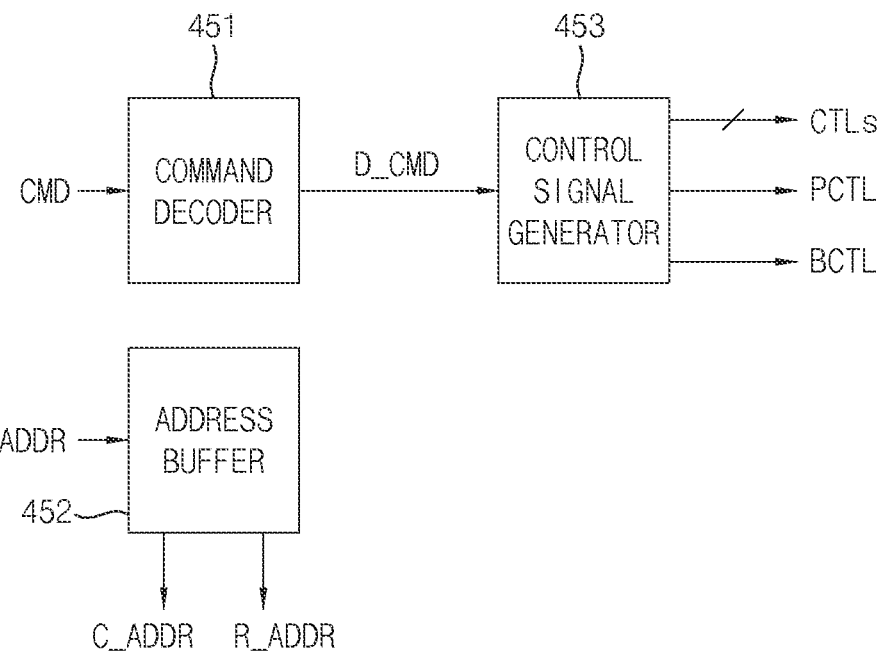
FIG. 21 is a block diagram illustrating the control circuit in the nonvolatile memory device of FIG. 5 according to some implementations.

FIG. 21 is a block diagram illustrating the control circuit in the nonvolatile memory device of FIG. 5 according to some implementations.

Referring to FIG. 21, the control circuit 450 includes a command decoder 451, an address buffer 452 and a control signal generator 453.

The command decoder 451 decodes the command CMD and provides a decoded command D_CMD to the control signal generator 453.

The address buffer 452 receives the address signal ADDR, provides the row address R_ADDR to the address decoder 430 and provides the column address C_ADDR to the data input/output circuit 420.

The control signal generator 453 receives the decoded command D_CMD, generates the control signals CTLs based on an operation directed by the decoded command D_CMD and the voltage level of the program pass voltage directed by the voltage level signal VLS, provides the control signals CTLs to the voltage generator 470, generates the page buffer control signal PCTL, provides the page buffer control signal PCTL to the page buffer circuit 410, generates the buffer control signal BCTL, and provides the buffer control signal BCTL to the secure buffer 500.

Figure 22:
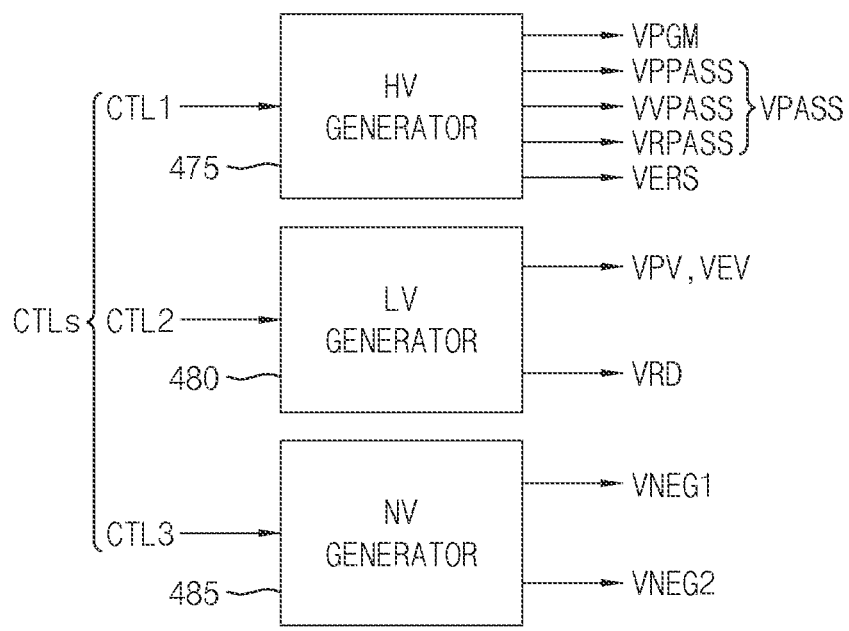
FIG. 22 is a block diagram illustrating the voltage generator in the nonvolatile memory device of FIG. 5 according to some implementations.

FIG. 22 is a block diagram illustrating the voltage generator in the nonvolatile memory device of FIG. 5 according to some implementations.

Referring to FIG. 22, the voltage generator 470 may include a high voltage HV generator 475 and a low voltage LV generator 480. The voltage generator 470 may further include a negative voltage generator 485.

The high voltage generator 470 may generate a program voltage VPGM, a program pass voltage VPPASS, a verification pass voltage VVPASS, a read pass voltage VRPASS and an erase voltage VERS according to operations directed by the command CMD, in response to a first control signal CTL1. The program pass voltage VPPASS, the verification pass voltage VVPASS and the read pass voltage VRPASS may be referred to as a pass voltage VPASS.

The program voltage PGM is applied to the selected word-line, the program pass voltage VPPASS, the verification pass voltage VVPASS, the read pass voltage VRPASS may be applied to the unselected word-lines, and the erase voltage VERS may be applied to the well of the memory block. The first control signal CTL1 may include a plurality of bits which indicate the operations directed by the decoded command D_CMD.

The low voltage generator 480 may generate a program verification voltage VPV, an erase verification voltage VER and a read voltage VRD according to operations directed by the command CMD, in response to a second control signal CTL2. The program verification voltage VPV, the read voltage VRD and the erase verification voltage VER may be applied to the selected word-line according to operation of the nonvolatile memory device 400. The second control signal CTL2 may include a plurality of bits which indicate the operations directed by the decode command D_CMD.

The negative voltage generator 485 may generate a first negative voltage VNEG1 and a second negative voltage VNEG2 which have negative levels according to operations directed by the command CMD, in response to a third control signal CTL3. The third control signal CTL3 may include a plurality of bits which indicate the operations directed by the decoded command D_CMD. The first negative voltage VNEG1 may be applied to a selected word-line and unselected word-lines during the program recovery period and the second negative voltage VNEG2 may be applied to the unselected word-lines during the bit-line set-up period.

Figure 23:
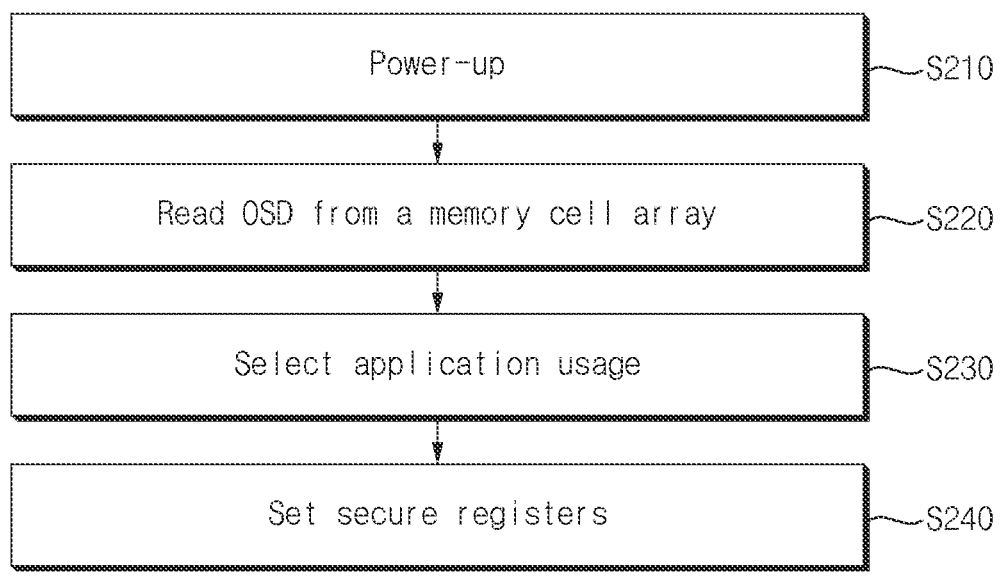
FIG. 23 is a flow chart illustrating an initialization operation of a memory system according to some implementations.

FIG. 23 is a flow chart illustrating an initialization operation of a memory system according to some implementations.

Referring to FIGS. 1 to 23, an initialization operation of a memory system 50 may be performed as follows.

As power is supplied, a power-up operation may be performed (operation S210). In this case, the nonvolatile memory device 400 reads the original setting data OSD from the memory cell array (operation S220). After a read operation on the original setting data OSD, an application usage may be selected in the memory controller 200 (operation S230).

The original setting data OSD may be dumped-down in the secure buffer 500 including a first register and second registers. When a portion of the setting data OSD dumped-down in the secure buffer 500 is to be changed according to the selected application, secure registers in the secure buffer 500 may be set (operation S240) with protection from hooking of the registers by changing the setting data stored in at least one of the second registers concurrently with changing the setting data stored in the first register and by recovering the changed setting data stored in the at least one of the second registers to corresponding original setting data.

Figure 24:
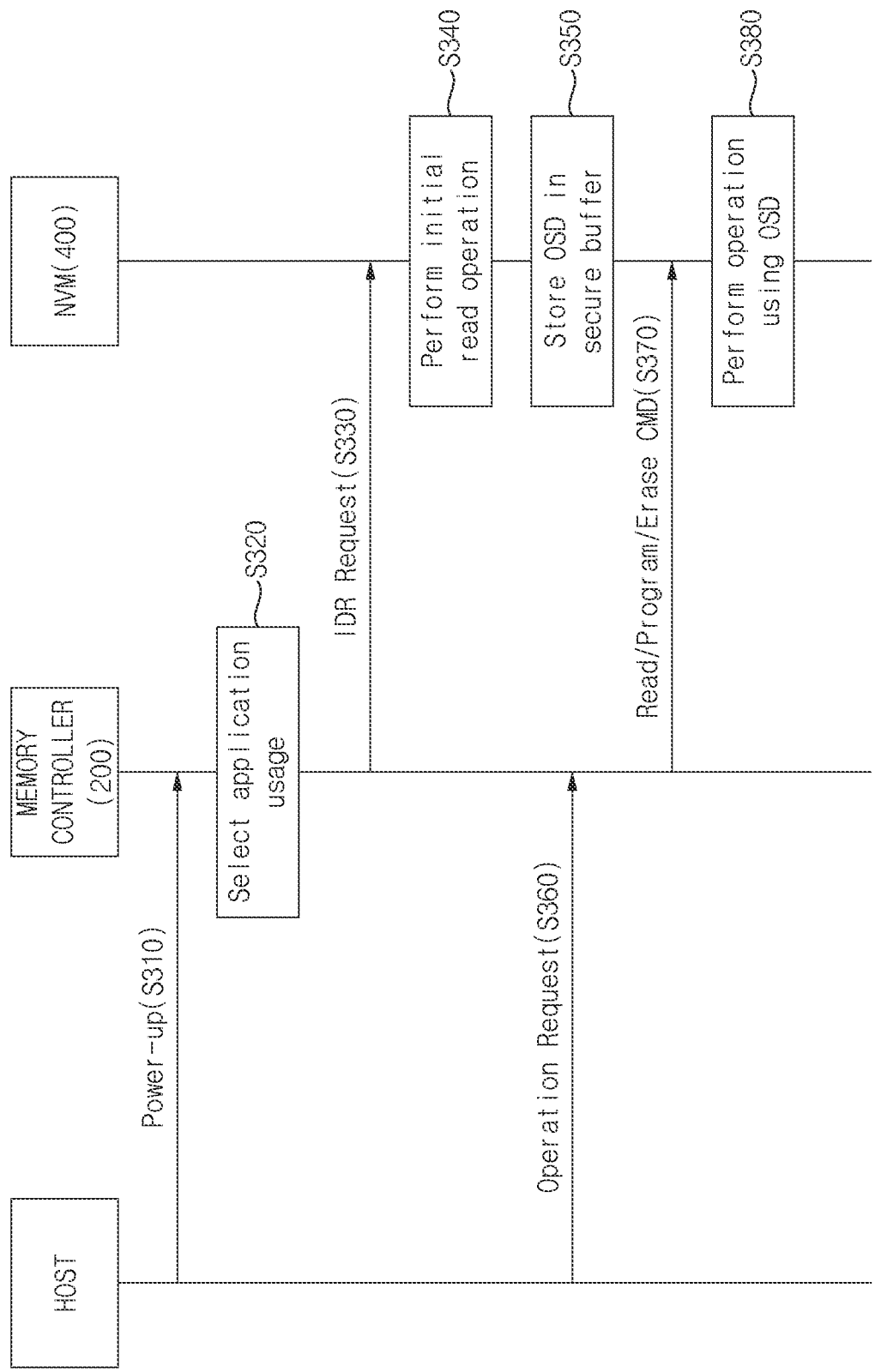
FIG. 24 is a diagram illustrating a method of operating a memory system according to some implementations.

FIG. 24 illustrates a method of operating a memory system according to some implementations.

Referring to FIGS. 1 to 24, a method of operating a memory system 50 may proceed as follows.

A host may transmit a power-up request to the memory controller 200 of the memory system 50 (operation S310). In this case, the power-up request may be directly performed according to power supply or may be performed according to a separate command from the host. Memory controller 200 may select an application usage of the nonvolatile memory device 400 according to the power-up request (operation S320). Thereafter, the memory controller 200 may transmit a read request (e.g., an initial read request) for original setting data according to the selected application usage (operation S330). The initial read request may include a read command and a corresponding address.

In some implementations, the initial read request may be arbitrarily transmitted to the nonvolatile memory device 400 according to a power-up operation or an operation for optimizing performance or reliability. The nonvolatile memory device 400 may perform an initial read operation in response to the read request for the original setting data (operation S340).

The original setting data OSD may be read from the meta area 406 of the memory cell array 405, based on the initial read operation.

The nonvolatile memory device 400 may store the original setting data OSD in registers 511, 512, 513 and 514 in the secure buffer 500 of FIG. 6 (operation S350). When the setting data stored in the first register 511 is to be changed, hooking of the registers may be protected by changing the setting data stored in at least one of the second registers 512, 513 and 514 concurrently with changing the setting data stored in the first register 511 and by recovering the changed setting data stored in the at least one of the second registers 512, 513 and 514 to corresponding original setting data.

Thereafter, the host may transmit an operation request (e.g., a read/write/delete request) to the memory controller 200 (operation S360). The memory controller 200 may transmit a read/program/erase command, corresponding to the operation request, to the nonvolatile memory device 400 (operation S370). The nonvolatile memory device 400 may perform an operation corresponding to the received command based on the setting data stored in the registers 511, 512, 513 and 514 in the secure buffer 500 (operation S380).

Figure 25:
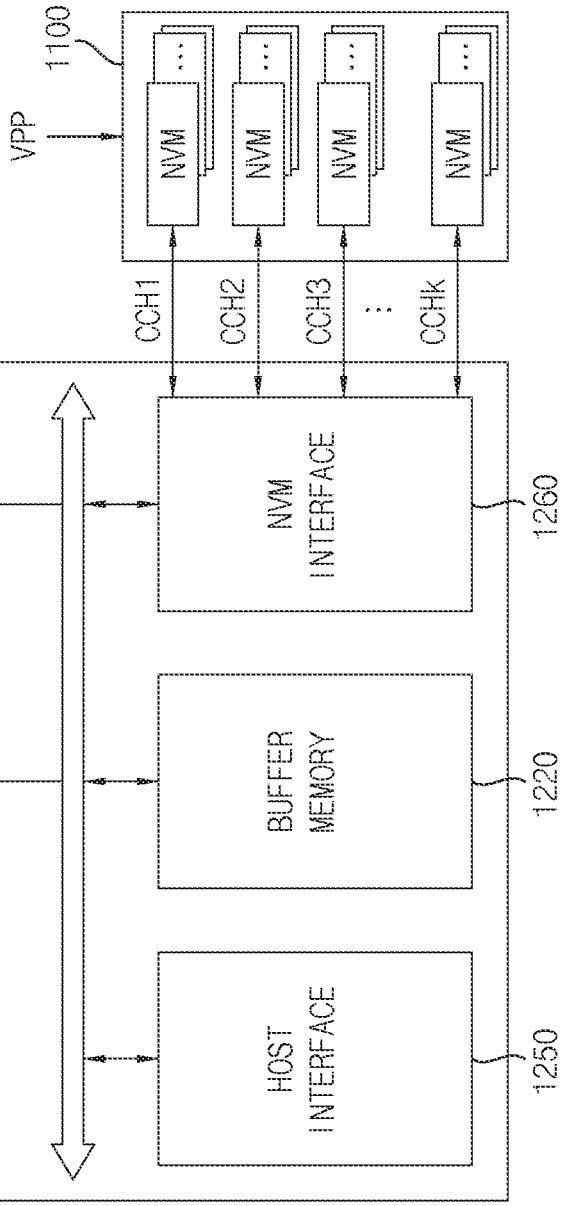
FIG. 25 is a block diagram illustrating a storage device that includes a nonvolatile memory device according to some implementations.

FIG. 25 is a block diagram illustrating a storage device that includes a nonvolatile memory device according to some implementations.

Referring to FIG. 25, a storage device 1000 includes a plurality of nonvolatile memory devices NVMs 1100 and a controller 1200. For example, the storage device 1000 may be any storage device such as an embedded multimedia card (eMMC), a universal flash storage (UFS), a solid state disc or solid state drive (SSD), etc.

The controller 1200 may be connected to the nonvolatile memory devices 1100 via a plurality of channels CCH1, CCH2, CCH3, . . . , CCHk. The controller 1200 may include one or more processors 1210, a buffer memory 1220, an error correction code (ECC) engine 1230, a host interface 1250 and a nonvolatile memory (NVM) interface 1260.

The buffer memory 1220 may store data used to drive the controller 1200. The ECC engine 1230 may calculate error correction code values of data to be programmed during a program operation, and may correct an error of read data using an error correction code value during a read operation. In a data recovery operation, the ECC engine 1230 may correct an error of data recovered from the nonvolatile memory devices 1100. The host interface 1250 may provide an interface with an external device. The nonvolatile memory interface 1260 may provide an interface with the nonvolatile memory devices 1100.

Each of the nonvolatile memory devices 1100 may correspond to the nonvolatile memory device according to some implementations, and may be optionally supplied with an external high voltage VPP.

Figure 26:
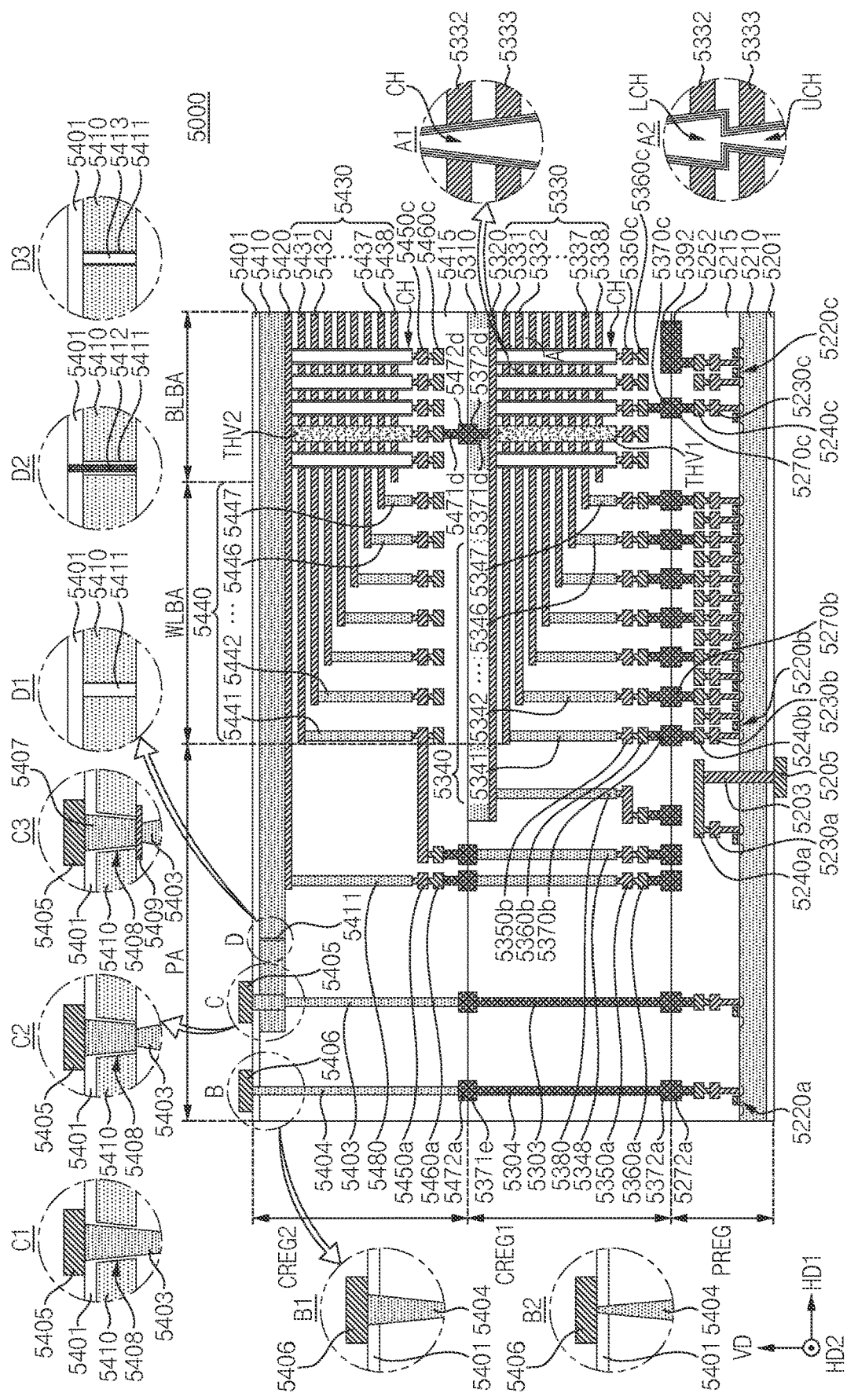
FIG. 26 is a cross-sectional view of a nonvolatile memory device according to some implementations.

FIG. 26 is a cross-sectional view of a nonvolatile memory device according to some implementations.

Referring to FIG. 26, a nonvolatile memory device (or a memory device) 5000 may have a chip-to-chip (C2C) structure. At least one upper chip including a cell region and a lower chip including a peripheral circuit region PREG may be manufactured separately, and then, the at least one upper chip and the lower chip may be connected to each other by a bonding method to realize the C2C structure. For example, the bonding method may mean a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. Alternatively, the bonding metal patterns may be formed of aluminum (Al) or tungsten (W).

The memory device 5000 may include the at least one upper chip including the cell region. For example, as illustrated in FIG. 26, the memory device 5000 may include two upper chips. However, the number of the upper chips is not limited thereto. In the case in which the memory device 5000 includes the two upper chips, a first upper chip including a first cell region CREG1, a second upper chip including a second cell region CREG2 and the lower chip including the peripheral circuit region PREG may be manufactured separately, and then, the first upper chip, the second upper chip and the lower chip may be connected to each other by the bonding method to manufacture the memory device 5000. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In other words, an upper portion of the lower chip may mean an upper portion defined based on +third direction VD, and the upper portion of each of the first and second upper chips may mean an upper portion defined based on −third direction VD in FIG. 31. However, implementations of the present disclosure are not limited thereto. In some implementations, one of the first upper chip and the second upper chip may be turned over and then may be connected to a corresponding chip by the bonding method.

Each of the peripheral circuit region PREG and the first and second cell regions CREG1 and CREG2 of the memory device 5000 may include an external pad bonding region PA, a word-line bonding region WLBA, and a bit-line bonding region BLBA.

The peripheral circuit region PREG may include a first substrate 5210 and a plurality of circuit elements 5220a, 5220b and 5220c formed on the first substrate 5210. An interlayer insulating layer 5215 including one or more insulating layers may be provided on the plurality of circuit elements 5220a, 5220b and 5220c, and a plurality of metal lines electrically connected to the plurality of circuit elements 5220a, 5220b and 5220c may be provided in the interlayer insulating layer 5215. For example, the plurality of metal lines may include first metal lines 5230a, 5230b and 5230c connected to the plurality of circuit elements 5220a, 5220b and 5220c, and second metal lines 5240a, 5240b and 5240c formed on the first metal lines 5230a, 5230b and 5230c. The plurality of metal lines may be formed of at least one of various conductive materials. For example, the first metal lines 5230a, 5230b and 5230c may be formed of tungsten having a relatively high electrical resistivity, and the second metal lines 5240a, 5240b and 5240c may be formed of copper having a relatively low electrical resistivity.

The first metal lines 5230a, 5230b and 5230c and the second metal lines 5240a, 5240b and 5240c are illustrated and described in the present implementation. However, implementations of the present disclosure are not limited thereto. In some implementations, at least one or more additional metal lines may further be formed on the second metal lines 5240a, 5240b and 5240c. In this case, the second metal lines 5240a, 5240b and 5240c may be formed of aluminum, and at least some of the additional metal lines formed on the second metal lines 5240a, 5240b and 5240c may be formed of copper having an electrical resistivity lower than that of aluminum of the second metal lines 5240a, 5240b and 5240c.

The interlayer insulating layer 5215 may be disposed on the first substrate 5210 and may include an insulating material such as silicon oxide and/or silicon nitride.

Each of the first and second cell regions CREG1 and CREG2 may include at least one memory block. The first cell region CREG1 may include a second substrate 5310 and a common source line 5320. A plurality of word-lines 5330 (5331 to 5338) may be stacked on the second substrate 5310 in the third direction VD perpendicular to a top surface of the second substrate 5310. String selection lines and a ground selection line may be disposed on and under the word-lines 5330, and the plurality of word-lines 5330 may be disposed between the string selection lines and the ground selection line. Likewise, the second cell region CREG2 may include a third substrate 5410 and a common source line 5420, and a plurality of word-lines 5430 (5431 to 5438) may be stacked on the third substrate 5410 in a direction (e.g., the Z-axis direction) perpendicular to a top surface of the third substrate 5410. Each of the second substrate 5310 and the third substrate 5410 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CREG1 and CREG2.

In some implementations, as illustrated in a region 'A1', the channel structure CH may be provided in the bit-line bonding region BLBA and may extend in the direction perpendicular to the top surface of the second substrate 5310 to penetrate the word-lines 5330, the string selection lines, and the ground selection line. The channel structure CH may include a data storage layer, a channel layer, and a filling insulation layer. The channel layer may be electrically connected to a first metal line 5350c and a second metal line 5360c in the bit-line bonding region BLBA. For example, the second metal line 5360c may be a bit-line and may be connected to the channel structure CH through the first metal line 5350c. The bit-line 5360c may extend in a second direction HD2 parallel to the top surface of the second substrate 5310.

In some implementations, as illustrated in a region 'A2', the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction perpendicular to the top surface of the second substrate 5310 to penetrate the common source line 5320 and lower word-lines 5331 and 5332. The lower channel LCH may include a data storage layer, a channel layer, and a filling insulation layer and may be connected to the upper channel UCH. The upper channel UCH may penetrate upper word-lines 5333 to 5338. The upper channel UCH may include a data storage layer, a channel layer, and a filling insulation layer, and the channel layer of the upper channel UCH may be electrically connected to the first metal line 5350c and the second metal line 5360c. As a length of a channel increases, due to characteristics of manufacturing processes, it may be difficult to form a channel having a substantially uniform width. The memory device 5000 according to the some implementations may include a channel having improved width uniformity due to the lower channel LCH and the upper channel UCH which are formed by the processes performed sequentially.

In the case in which the channel structure CH includes the lower channel LCH and the upper channel UCH as illustrated in the region 'A2', a word-line located near to a boundary between the lower channel LCH and the upper channel UCH may be a dummy word-line. For example, the word-lines 5332 and 5333 adjacent to the boundary between the lower channel LCH and the upper channel UCH may be the dummy word-lines. In this case, data may not be stored in memory cells connected to the dummy word-line. Alternatively, the number of pages corresponding to the memory cells connected to the dummy word-line may be less than the number of pages corresponding to the memory cells connected to a general word-line. A level of a voltage applied to the dummy word-line may be different from a level of a voltage applied to the general word-line, and thus it is possible to reduce an influence of a non-uniform channel width between the lower and upper channels LCH and UCH on an operation of the memory device 5000.

Meanwhile, the number of the lower word-lines 5331 and 5332 penetrated by the lower channel LCH is less than the number of the upper word-lines 5333 to 5338 penetrated by the upper channel UCH in the region 'A2'. However, implementations of the present disclosure are not limited thereto. In some implementations, the number of the lower word-lines penetrated by the lower channel LCH may be equal to or more than the number of the upper word-lines penetrated by the upper channel UCH. In addition, structural features and connection relation of the channel structure CH disposed in the second cell region CREG2 may be substantially the same as those of the channel structure CH disposed in the first cell region CREG1.

In the bit-line bonding region BLBA, a first through-electrode THV1 may be provided in the first cell region CREG1, and a second through-electrode THV2 may be provided in the second cell region CREG2. As illustrated in FIG. 26, the first through-electrode THV1 may penetrate the common source line 5320 and the plurality of word-lines 5330. In some implementations, the first through-electrode THV1 may further penetrate the second substrate 5310. The first through-electrode THV1 may include a conductive material. Alternatively, the first through-electrode THV1 may include a conductive material surrounded by an insulating material. The second through-electrode THV2 may have the same shape and structure as the first through-electrode THV1.

In some implementations, the first through-electrode THV1 and the second through-electrode THV2 may be electrically connected to each other through a first through-metal pattern 5372d and a second through-metal pattern 5472d. The first through-metal pattern 5372d may be formed at a bottom end of the first upper chip including the first cell region CREG1, and the second through-metal pattern 5472d may be formed at a top end of the second upper chip including the second cell region CREG2. The first through-electrode THV1 may be electrically connected to the first metal line 5350c and the second metal line 5360c. A lower via 5371d may be formed between the first through-electrode THV1 and the first through-metal pattern 5372d, and an upper via 5471d may be formed between the second through-electrode THV2 and the second through-metal pattern 5472d. The first through-metal pattern 5372d and the second through-metal pattern 5472d may be connected to each other by the bonding method.

In addition, in the bit-line bonding region BLBA, an upper metal pattern 5252 may be formed in an uppermost metal layer of the peripheral circuit region PERI, and an upper metal pattern 5392 having the same shape as the upper metal pattern 5252 may be formed in an uppermost metal layer of the first cell region CREG1. The upper metal pattern 5392 of the first cell region CREG1 and the upper metal pattern 5252 of the peripheral circuit region PREG may be electrically connected to each other by the bonding method. In the bit-line bonding region BLBA, the bit-line 5360c may be electrically connected to a page buffer included in the peripheral circuit region PERI. For example, some of the circuit elements 5220c of the peripheral circuit region PREG may constitute the page buffer, and the bit-line 5360c may be electrically connected to the circuit elements 5220c constituting the page buffer through an upper bonding metal pattern 5370c of the first cell region CREG1 and an upper bonding metal pattern 5270c of the peripheral circuit region PERI.

Referring continuously to FIG. 26, in the word-line bonding region WLBA, the word-lines 5330 of the first cell region CREG1 may extend in a first direction HD1 parallel to the top surface of the second substrate 5310 and may be connected to a plurality of cell contact plugs 5340 (5341 to 5347). First metal lines 5350b and second metal lines 5360b may be sequentially connected onto the cell contact plugs 5340 connected to the word-lines 5330. In the word-line bonding region WLBA, the cell contact plugs 5340 may be connected to the peripheral circuit region PREG through upper bonding metal patterns 5370b of the first cell region CREG1 and upper bonding metal patterns 5270b of the peripheral circuit region PERI.

The cell contact plugs 5340 may be electrically connected to a row decoder included in the peripheral circuit region PERI. For example, some of the circuit elements 5220b of the peripheral circuit region PREG may constitute the row decoder, and the cell contact plugs 5340 may be electrically connected to the circuit elements 5220b constituting the row decoder through the upper bonding metal patterns 5370b of the first cell region CREG1 and the upper bonding metal patterns 5270b of the peripheral circuit region PERI. In some implementations, an operating voltage of the circuit elements 5220b constituting the row decoder may be different from an operating voltage of the circuit elements 5220c constituting the page buffer. For example, the operating voltage of the circuit elements 5220c constituting the page buffer may be greater than the operating voltage of the circuit elements 5220b constituting the row decoder.

Likewise, in the word-line bonding region WLBA, the word-lines 5430 of the second cell region CREG2 may extend in the first direction HD1 parallel to the top surface of the third substrate 5410 and may be connected to a plurality of cell contact plugs 5440 (5441 to 5447). The cell contact plugs 5440 may be connected to the peripheral circuit region PREG through an upper metal pattern of the second cell region CREG2 and lower and upper metal patterns and a cell contact plug 5348 of the first cell region CREG1.

In the word-line bonding region WLBA, the upper bonding metal patterns 5370b may be formed in the first cell region CREG1, and the upper bonding metal patterns 5270b may be formed in the peripheral circuit region PERI. The upper bonding metal patterns 5370b of the first cell region CREG1 and the upper bonding metal patterns 5270b of the peripheral circuit region PREG may be electrically connected to each other by the bonding method. The upper bonding metal patterns 5370b and the upper bonding metal patterns 5270b may be formed of aluminum, copper, or tungsten.

In the external pad bonding region PA, a lower metal pattern 5371e may be formed in a lower portion of the first cell region CREG1, and an upper metal pattern 5472a may be formed in an upper portion of the second cell region CREG2. The lower metal pattern 5371e of the first cell region CREG1 and the upper metal pattern 5472a of the second cell region CREG2 may be connected to each other by the bonding method in the external pad bonding region PA. Likewise, an upper metal pattern 5372a may be formed in an upper portion of the first cell region CREG1, and an upper metal pattern 5272a may be formed in an upper portion of the peripheral circuit region PERI. The upper metal pattern 5372a of the first cell region CREG1 and the upper metal pattern 5272a of the peripheral circuit region PREG may be connected to each other by the bonding method.

Common source line contact plugs 5380 and 5480 may be disposed in the external pad bonding region PA. The common source line contact plugs 5380 and 5480 may be formed of a conductive material such as a metal, a metal compound, and/or doped polysilicon. The common source line contact plug 5380 of the first cell region CREG1 may be electrically connected to the common source line 5320, and the common source line contact plug 5480 of the second cell region CREG2 may be electrically connected to the common source line 5420. A first metal line 5350a and a second metal line 5360a may be sequentially stacked on the common source line contact plug 5380 of the first cell region CREG1, and a first metal line 5450a and a second metal line 5460a may be sequentially stacked on the common source line contact plug 5480 of the second cell region CREG2.

Input/output pads 5205, 5405 and 5406 may be disposed in the external pad bonding region PA. Referring to FIG. 26, a lower insulating layer 5201 may cover a bottom surface of the first substrate 5210, and a first input/output pad 5205 may be formed on the lower insulating layer 5201. The first input/output pad 5205 may be connected to at least one of a plurality of the circuit elements 5220a disposed in the peripheral circuit region PREG through a first input/output contact plug 5203 and may be separated from the first substrate 5210 by the lower insulating layer 5201. In addition, a side insulating layer may be disposed between the first input/output contact plug 5203 and the first substrate 5210 to electrically isolate the first input/output contact plug 5203 from the first substrate 5210.

An upper insulating layer 5401 covering a top surface of the third substrate 5410 may be formed on the third substrate 5410. A second input/output pad 5405 and/or a third input/output pad 5406 may be disposed on the upper insulating layer 5401. The second input/output pad 5405 may be connected to at least one of the plurality of circuit elements 5220a disposed in the peripheral circuit region PREG through second input/output contact plugs 5403 and 5303, and the third input/output pad 5406 may be connected to at least one of the plurality of circuit elements 5220a disposed in the peripheral circuit region PREG through third input/output contact plugs 5404 and 5304.

In some implementations, the third substrate 5410 may not be disposed in a region in which the input/output contact plug is disposed. For example, as illustrated in a region 'B', the third input/output contact plug 5404 may be separated from the third substrate 5410 in a direction parallel to the top surface of the third substrate 5410 and may penetrate an interlayer insulating layer 5415 of the second cell region CREG2 so as to be connected to the third input/output pad 5406. In this case, the third input/output contact plug 5404 may be formed by at least one of various processes.

In some implementations, as illustrated in a region 'B1', the third input/output contact plug 5404 may extend in the third direction VD, and a diameter of the third input/output contact plug 5404 may become progressively greater toward the upper insulating layer 5401. In other words, a diameter of the channel structure CH described in the region 'A1' may become progressively less toward the upper insulating layer 5401, but the diameter of the third input/output contact plug 5404 may become progressively greater toward the upper insulating layer 5401. For example, the third input/output contact plug 5404 may be formed after the second cell region CREG2 and the first cell region CREG1 are bonded to each other by the bonding method.

In some implementations, as illustrated in a region 'B2', the third input/output contact plug 5404 may extend in the third direction VD, and a diameter of the third input/output contact plug 5404 may become progressively less toward the upper insulating layer 5401. In other words, like the channel structure CH, the diameter of the third input/output contact plug 5404 may become progressively less toward the upper insulating layer 5401. For example, the third input/output contact plug 5404 may be formed together with the cell contact plugs 5440 before the second cell region CREG2 and the first cell region CREG1 are bonded to each other.

In some implementations, the input/output contact plug may overlap with the third substrate 5410. For example, as illustrated in a region 'C', the second input/output contact plug 5403 may penetrate the interlayer insulating layer 5415 of the second cell region CREG2 in the third direction VD and may be electrically connected to the second input/output pad 5405 through the third substrate 5410. In this case, a connection structure of the second input/output contact plug 5403 and the second input/output pad 5405 may be realized by various methods.

In some implementations, as illustrated in a region 'C1', an opening 5408 may be formed to penetrate the third substrate 5410, and the second input/output contact plug 5403 may be connected directly to the second input/output pad 5405 through the opening 5408 formed in the third substrate 5410. In this case, as illustrated in the region 'C1', a diameter of the second input/output contact plug 5403 may become progressively greater toward the second input/output pad 5405. However, implementations of the present disclosure are not limited thereto, and, in some implementations, the diameter of the second input/output contact plug 5403 may become progressively less toward the second input/output pad 5405.

In some implementations, as illustrated in a region 'C2', the opening 5408 penetrating the third substrate 5410 may be formed, and a contact 5407 may be formed in the opening 5408. An end of the contact 5407 may be connected to the second input/output pad 5405, and another end of the contact 5407 may be connected to the second input/output contact plug 5403. Thus, the second input/output contact plug 5403 may be electrically connected to the second input/output pad 5405 through the contact 5407 in the opening 5408. In this case, as illustrated in the region 'C2', a diameter of the contact 5407 may become progressively greater toward the second input/output pad 5405, and a diameter of the second input/output contact plug 5403 may become progressively less toward the second input/output pad 5405. For example, the second input/output contact plug 5403 may be formed together with the cell contact plugs 5440 before the second cell region CREG2 and the first cell region CREG1 are bonded to each other, and the contact 5407 may be formed after the second cell region CREG2 and the first cell region CREG1 are bonded to each other.

In some implementations illustrated in a region 'C3', a stopper 5409 may further be formed on a bottom end of the opening 5408 of the third substrate 5410, as compared with the implementations of the region 'C2'. The stopper 5409 may be a metal line formed in the same layer as the common source line 5420. Alternatively, the stopper 5409 may be a metal line formed in the same layer as at least one of the word-lines 5430. The second input/output contact plug 5403 may be electrically connected to the second input/output pad 5405 through the contact 5407 and the stopper 5409.

Like the second and third input/output contact plugs 5403 and 5404 of the second cell region CREG2, a diameter of each of the second and third input/output contact plugs 5303 and 5304 of the first cell region CREG1 may become progressively less toward the lower metal pattern 5371e or may become progressively greater toward the lower metal pattern 5371e.

Meanwhile, in some implementations, a slit 5411 may be formed in the third substrate 5410. For example, the slit 5411 may be formed at a certain position of the external pad bonding region PA. For example, as illustrated in a region 'D', the slit 5411 may be located between the second input/output pad 5405 and the cell contact plugs 5440 when viewed in a plan view. Alternatively, the second input/output pad 5405 may be located between the slit 5411 and the cell contact plugs 5440 when viewed in a plan view.

In some implementations, as illustrated in a region 'D1', the slit 5411 may be formed to penetrate the third substrate 5410. For example, the slit 5411 may be used to prevent the third substrate 5410 from being finely cracked when the opening 5408 is formed. However, implementations of the present disclosure are not limited thereto, and In some implementations, the slit 5411 may be formed to have a depth ranging from about 60% to about 70% of a thickness of the third substrate 5410.

In some implementations, as illustrated in a region 'D2', a conductive material 5412 may be formed in the slit 5411. For example, the conductive material 5412 may be used to discharge a leakage current occurring in driving of the circuit elements in the external pad bonding region PA to the outside. In this case, the conductive material 5412 may be connected to an external ground line.

In some implementations, as illustrated in a region 'D3', an insulating material 5413 may be formed in the slit 5411. For example, the insulating material 5413 may be used to electrically isolate the second input/output pad 5405 and the second input/output contact plug 5403 disposed in the external pad bonding region PA from the word-line bonding region WLBA. Since the insulating material 5413 is formed in the slit 5411, it is possible to prevent a voltage provided through the second input/output pad 5405 from affecting a metal layer disposed on the third substrate 5410 in the word-line bonding region WLBA.

Meanwhile, in some implementations, the first to third input/output pads 5205, 5405 and 5406 may be selectively formed. For example, the memory device 5000 may be realized to include only the first input/output pad 5205 disposed on the first substrate 5210, to include only the second input/output pad 5405 disposed on the third substrate 5410, or to include only the third input/output pad 5406 disposed on the upper insulating layer 5401.

In some implementations, at least one of the second substrate 5310 of the first cell region CREG1 or the third substrate 5410 of the second cell region CREG2 may be used as a sacrificial substrate and may be completely or partially removed before or after a bonding process. An additional layer may be stacked after the removal of the substrate. For example, the second substrate 5310 of the first cell region CREG1 may be removed before or after the bonding process of the peripheral circuit region PREG and the first cell region CREG1, and then, an insulating layer covering a top surface of the common source line 5320 or a conductive layer for connection may be formed. Likewise, the third substrate 5410 of the second cell region CREG2 may be removed before or after the bonding process of the first cell region CREG1 and the second cell region CREG2, and then, the upper insulating layer 5401 covering a top surface of the common source line 5420 or a conductive layer for connection may be formed.

Figure 27:
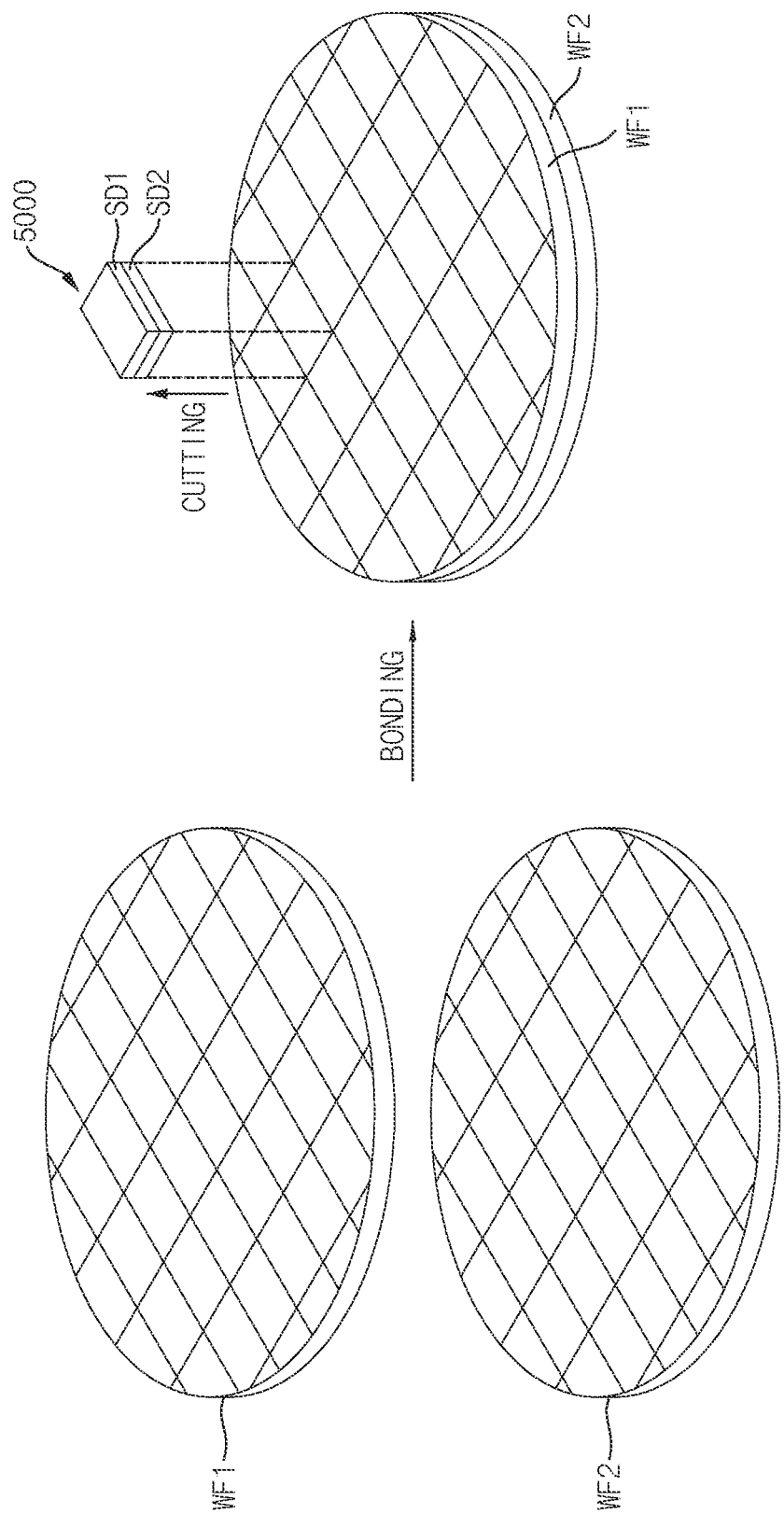
FIG. 27 is a diagram illustrating a manufacturing process of a stacked semiconductor device according to some implementations.

FIG. 27 is a diagram illustrating a manufacturing process of a stacked semiconductor device according to some implementations.

Referring to FIG. 27, respective integrated circuits may be formed on a first wafer WF1 and a second wafer WF2. The memory cell array may be formed in the first wafer WF1, and the peripheral circuits may be formed in the second wafer WF2.

After the various integrated circuits have been respectively formed on the first and second wafers WF1 and WF2, the first wafer WF1 and the second wafer WF2 may be bonded together. The bonded wafers WF1 and WF2 may then be cut (or divided) into separate chips, in which each chip corresponds to a semiconductor device such as, for example, the memory device 5000, including a first semiconductor die SD1 and a second semiconductor die SD2 that are stacked vertically (e.g., the first semiconductor die SD1 is stacked on the second semiconductor die SD2, etc.). Each cut portion of the first wafer WF1 corresponds to the first semiconductor die SD1, and each cut portion of the second wafer WF2 corresponds to the second semiconductor die SD2. For example, the memory device 5000 of FIG. 26 may be manufactured based on the manufacturing process of FIG. 27.

Figure 28:
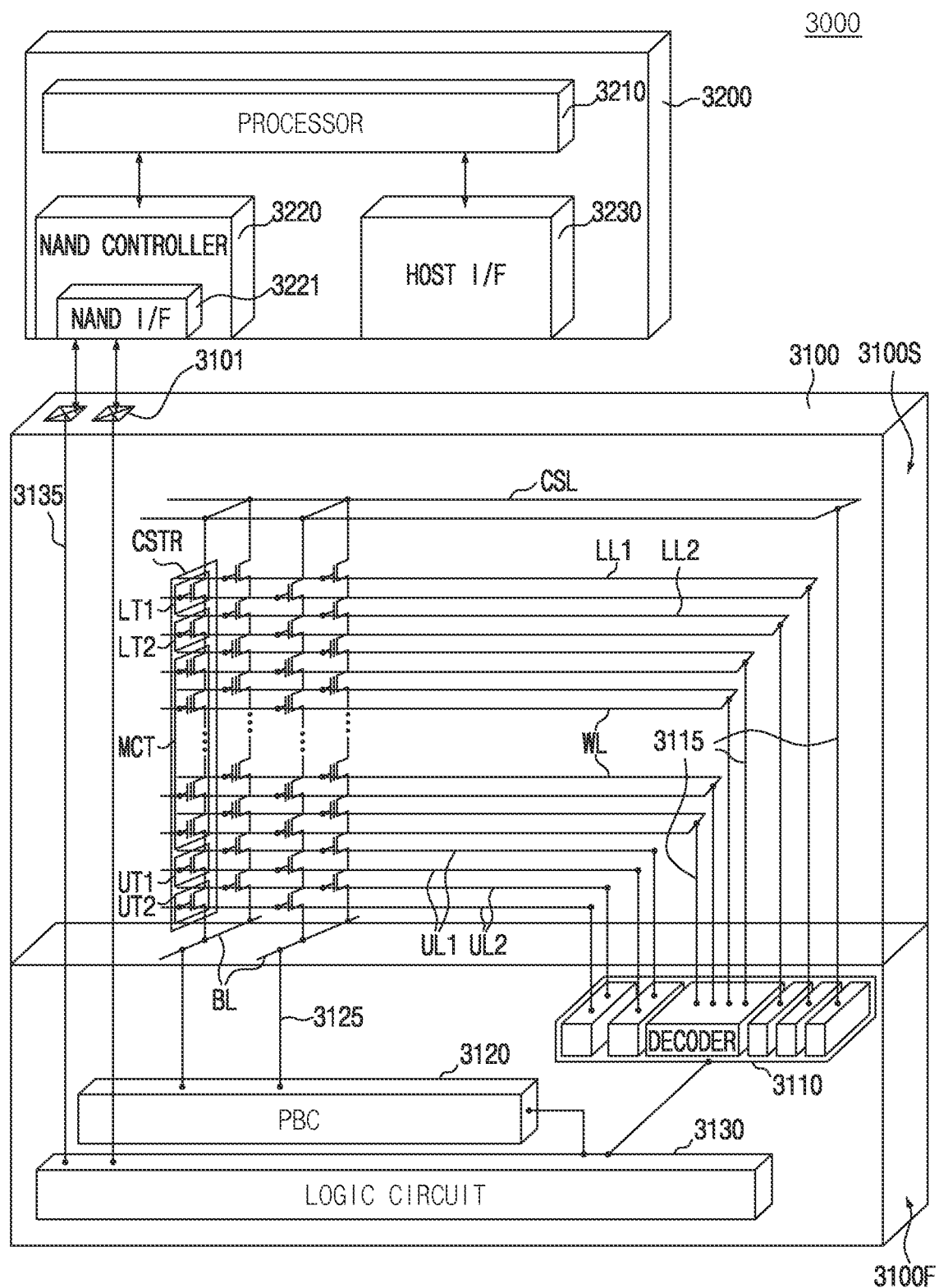
FIG. 28 is a block diagram illustrating an electronic system including a semiconductor device according to some implementations.

FIG. 28 is a block diagram illustrating an electronic system including a semiconductor device according to some implementations.

Referring to FIG. 28, an electronic system 3000 may include a semiconductor device 3100 and a controller 3200 electrically connected to the semiconductor device 3100. The electronic system 3000 may be a storage device including one or a plurality of semiconductor devices 3100 or an electronic device including a storage device. For example, the electronic system 3000 may be a solid state drive (SSD) device, a universal serial bus (USB), a computing system, a medical device, or a communication device that may include one or a plurality of semiconductor devices 3100.

The semiconductor device 3100 may be a non-volatile memory device, for example, a NAND flash memory device that is illustrated with reference to FIGS. 5 to 22, and may include a secure buffer including a plurality of registers with restricted access. The semiconductor device 3100 may include a first structure 3100F and a second structure 3100S on the first structure 3100F. The first structure 3100F may be a peripheral circuit structure including a decoder circuit 3110, a page buffer circuit 3120, and a logic circuit 3130. The second structure 3100S may be a memory cell structure including a bit-line BL, a common source line CSL, word-lines WL, first and second upper gate lines UL1 and UL2, first and second lower gate lines LL1 and LL2, and memory cell strings CSTR between the bit line BL and the common source line CSL.

In the second structure 3100S, each of the memory cell strings CSTR may include lower transistors LT1 and LT2 adjacent to the common source line CSL, upper transistors UT1 and UT2 adjacent to the bit-line BL, and a plurality of memory cell transistors MCT between the lower transistors LT1 and LT2 and the upper transistors UT1 and UT2. The number of the lower transistors LT1 and LT2 and the number of the upper transistors UT1 and UT2 may be varied in accordance with various implementations.

In some implementations, the upper transistors UT1 and UT2 may include string selection transistors, and the lower transistors LT1 and LT2 may include ground selection transistors. The lower gate lines LL1 and LL2 may be gate electrodes of the lower transistors LT1 and LT2, respectively. The word lines WL may be gate electrodes of the memory cell transistors MCT, respectively, and the upper gate lines UL1 and UL2 may be gate electrodes of the upper transistors UT1 and UT2, respectively.

In some implementations, the lower transistors LT1 and LT2 may include a lower erase control transistor LT1 and a ground selection transistor LT2 that may be connected with each other in serial. The upper transistors UT1 and UT2 may include a string selection transistor UT1 and an upper erase control transistor UT2. At least one of the lower erase control transistor LT1 and the upper erase control transistor UT2 may be used in an erase operation for erasing data stored in the memory cell transistors MCT through gate induced drain leakage (GIDL) phenomenon.

The common source line CSL, the first and second lower gate lines LL1 and LL2, the word lines WL, and the first and second upper gate lines UL1 and UL2 may be electrically connected to the decoder circuit 3110 through first connection wirings 1115 extending to the second structure 3110S in the first structure 3100F. The bit-lines BL may be electrically connected to the page buffer circuit 3120 through second connection wirings 3125 extending to the second structure 3100S in the first structure 3100F.

In the first structure 3100F, the decoder circuit 3110 and the page buffer circuit 3120 may perform a control operation for at least one selected memory cell transistor among the plurality of memory cell transistors MCT. The decoder circuit 3110 and the page buffer circuit 3120 may be controlled by the logic circuit 3130. The semiconductor device 3100 may communicate with the controller 3200 through an input/output pad 3101 electrically connected to the logic circuit 3130. The input/output pad 3101 may be electrically connected to the logic circuit 3130 through an input/output connection wiring 3135 extending to the second structure 3100S in the first structure 3100F.

The controller 3200 may include a processor 3210, a NAND controller 3220, and a host interface 3230. The electronic system 3000 may include a plurality of semiconductor devices 3100, and in this case, the controller 3200 may control the plurality of semiconductor devices 3100.

The processor 3210 may control operations of the electronic system 3000 including the controller 3200. The processor 3210 may be operated by firmware, and may control the NAND controller 3220 to access the semiconductor device 3100. The NAND controller 3220 may include a NAND interface 3221 for communicating with the semiconductor device 3100. Through the NAND interface 3221, control command for controlling the semiconductor device 3100, data to be written in the memory cell transistors MCT of the semiconductor device 3100, data to be read from the memory cell transistors MCT of the semiconductor device 3100, etc., may be transferred. The host interface 3230 may provide communication between the electronic system 3000 and an outside host. When control command is received from the outside host through the host interface 3230, the processor 3210 may control the semiconductor device 3100 in response to the control command.

A nonvolatile memory device or a storage device according to some implementations may be packaged using various package types or package configurations.

The present disclosure may be applied to various electronic devices and systems that include the nonvolatile memory devices and the memory packages. For example, the present disclosure may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

The foregoing is illustrative of examples and is not to be construed as limiting thereof. Although a few examples have been described, those skilled in the art will readily appreciate that many modifications are possible without materially departing from the novel teachings and advantages of the present disclosure. Accordingly, all such modifications are intended to be included within the scope of the present disclosure as defined in the claims.

What is claimed is:

1. A nonvolatile memory device comprising:
a memory cell array configured to store original setting data;
a page buffer circuit connected to the memory cell array through a plurality of bit-lines;
a secure buffer including an access control circuit and a plurality of registers with restricted access, the plurality of registers configured to store the original setting data that is dumped-down from the memory cell array through the page buffer circuit in an initialization sequence; and
a control circuit configured to control the page buffer circuit and the secure buffer,
wherein the plurality of registers includes a first register and second registers, and
wherein the access control circuit is configured to access, in response to the first register being accessed, at least a portion of the second registers concurrently with accessing the first register.

2. The nonvolatile memory device of claim 1, wherein the first register being accessed results in first setting data stored in the first register being changed, and
wherein the access control circuit is configured to change a respective setting data stored in each of the second registers by accessing the second registers concurrently with accessing the first register.

3. The nonvolatile memory device of claim 2, wherein the access control circuit includes:
a first AND gate configured to generate a first selection signal for selecting the first register based on a register access mode signal and bits of a first register address designating the first register;
second AND gates configured to generate intermediate selection signals associated with selecting the second registers based on the register access mode signal and bits of second register addresses designating the second registers; and
OR gates configured to generate second selection signals for selecting a respective second register of the second registers by performing an OR operation on the first selection signal and a corresponding intermediate selection signal of the intermediate selection signals.

4. The nonvolatile memory device of claim 3, wherein the first register is accessed and the first setting data stored in the first register is changed in response to an activation of the first selection signal, and
wherein the access control circuit is configured to change the respective setting data stored in each of the second registers by accessing the second registers concurrently with accessing the first register, by activating the second selection signals.

5. The nonvolatile memory device of claim 4, wherein the access control circuit is configured to:
deactivate the first selection signal after the respective setting data stored in each of the second registers is changed, and
recover respective changed setting data in each of the second registers to a respective original setting data.

6. The nonvolatile memory device of claim 5, wherein the control circuit is configured to perform a core operation based on the changed first setting data and the recovered respective original setting data stored in the first register and the second registers.

7. The nonvolatile memory device of claim 1, wherein the access control circuit is configured to:
group the second registers into at least two groups;
when the first register is accessed and first setting data stored in the first register is changed, access a first group of the at least two groups concurrently with accessing the first register; and
change setting data stored in at least one register of the first group.

8. The nonvolatile memory device of claim 7, wherein the access control circuit includes:
a first AND gate configured to generate a first selection signal for selecting the first register based on a register access mode signal and bits of a first register address designating the first register;
second AND gates configured to generate intermediate selection signals associated with selecting the second registers based on the register access mode signal and bits of second register addresses designating the second registers;

third AND gates configured to generate group selection signals for selecting respective groups of the at least two groups based on group selection information that is based on a combination of consecutive commands; and OR gates configured to generate second selection signals for selecting a respective second register of the second registers by performing an OR operation on the first selection signal, a corresponding group selection signal of the group selection signals, and a corresponding intermediate selection signal of the intermediate selection signals.

9. The nonvolatile memory device of claim 8, wherein the at least two groups include the first group and a second group, and wherein the access control circuit is configured to change, when the first register is accessed and the first setting data stored in the first register is changed in response to an activation of the first selection signal, setting data stored in at least one second register in the first group by activating a first group selection signal of the group selection signals.

10. The nonvolatile memory device of claim 9, wherein the access control circuit is configured to:

deactivate the first selection signal after the setting data stored in the at least one second register is changed, select the at least one second register, and recover the changed setting data in the at least one second register to the original setting data.

11. The nonvolatile memory device of claim 8, wherein the at least two groups include the first group and a second group, and wherein the access control circuit is configured to change, when the first register is accessed and the first setting data stored in the first register is changed in response to an activation of the first selection signal, setting data stored in at least one second register in the second group by activating a second group selection signal of the group selection signals.

12. The nonvolatile memory device of claim 11, wherein the access control circuit is configured to:

deactivate the first selection signal after the setting data stored in the at least one second register is changed, select the at least one second register, and recover the changed setting data in the at least one second register to the original setting data.

13. The nonvolatile memory device of claim 1, wherein the access control circuit is configured to, when the first register is accessed and first setting data stored in the first register is changed:

cut off access to the second registers based on being configured in a first mode; or change a respective setting data stored in each of the second registers by accessing the second registers concurrently with accessing the first register based on being configured in a second mode.

14. The nonvolatile memory device of claim 1, wherein the access control circuit includes:

a first AND gate configured to generate a first mode selection signal that is activated in a first mode based on a setting data dump signal designating the first mode, a register access mode signal, and bits of a first register address designating the first register;

a second AND gate configured to generate a second mode selection signal that is activated in a second mode based on a pin reduction mode signal designating the second mode, the register access mode signal, and the bits of the first register address;

third AND gates configured to generate intermediate selection signals associated with selecting the second registers based on the register access mode signal and bits second register addresses designating the second registers;

a first OR gate configured to generate a first selection signal for selecting the first register by performing an OR operation on the first mode selection signal and the second mode selection signal; and second OR gates configured to generate second selection signals for selecting a respective second register of the second registers by performing an OR operation on the second mode selection signal and a corresponding intermediate selection signal of the intermediate selection signals.

15. The nonvolatile memory device of claim 14, wherein the first mode is a mode in which the original setting data is dumped-down, and wherein the access control circuit is configured to:

based on being configured in the first mode, cut off access to the second registers when the first register is accessed by activating the first mode selection signal and deactivating the second mode selection signal.

16. The nonvolatile memory device of claim 14, wherein the second mode is a mode in which a test is performed on the nonvolatile memory device, and wherein the access control circuit is configured to:

based on being configured in the second mode, permit access to the second registers when the first register is accessed by deactivating the first mode selection signal and activating the second mode selection signal.

17. The nonvolatile memory device of claim 1, wherein the memory cell array includes at least one memory block including a plurality of cell strings, wherein each of the plurality of cell strings includes a string selection transistor, a plurality of memory cells, and a ground selection transistor which are connected in series and disposed in a vertical direction between each of a plurality of bit-lines and a common source line, wherein the memory cell array is configured to store replica setting data that is generated by replicating the original setting data, and wherein the page buffer circuit includes a verification circuit configured to perform verification on the original setting data based on the original setting data and the replica setting data.

18. A memory system comprising:

a nonvolatile memory device; and a memory controller configured to control the nonvolatile memory device, wherein the nonvolatile memory device comprises:

a memory cell array configured to store original setting data;

a page buffer circuit connected to the memory cell array through a plurality of bit-lines;

a secure buffer including an access control circuit and a plurality of registers with restricted access, the plurality of registers configured to store the original setting data that is dumped-down from the memory cell array through the page buffer circuit in an initialization sequence; and a control circuit configured to control the page buffer circuit and the secure buffer, wherein the plurality of registers includes a first register and second registers, and wherein the access control circuit is configured to, in response to the first register being accessed, access at least a portion of the second registers concurrently with accessing the first register.

19. The memory system of claim 18, wherein the access control circuit includes:
   a first AND gate configured to generate a first selection signal for selecting the first register based on a register access mode signal and bits of a first register address designating the first register;
   second AND gates configured to generate intermediate selection signals associated with selecting the second registers based on the register access mode signal and bits of second register addresses designating the second registers; and
   OR gates configured to generate second selection signals for selecting a respective second register of the second registers by performing an OR operation on the first selection signal and a corresponding intermediate selection signal of the intermediate selection signals.

20. A nonvolatile memory device comprising:
   a memory cell array configured to store original setting data;
   a page buffer circuit connected to the memory cell array through a plurality of bit-lines;
   a secure buffer including an access control circuit and a plurality of registers with restricted access, the plurality of registers configured to store the original setting data that is dumped-down from the memory cell array through the page buffer circuit in an initialization sequence; and
   a control circuit configured to control the page buffer circuit and the secure buffer,
   wherein the plurality of registers includes a first register and second registers, and
   wherein the access control circuit is configured to access, in response to the first register being accessed, at least a portion of the second registers concurrently with accessing the first register,
   wherein the access control circuit is configured to:
      when the first register is accessed and first setting data stored in the first register is changed, change a respective setting data stored in each of the second registers by accessing the second registers concurrently with accessing the first register, and
      recover respective changed setting data stored in each of the second registers to a respective original setting data, and
   wherein the control circuit is configured to perform a core operation based on the changed first setting data and the recovered respective original setting data stored in the first register and the second registers.

* * * * *